(12) United States Patent
McColgan

(10) Patent No.: US 9,276,917 B2
(45) Date of Patent: Mar. 1, 2016

(54) SYSTEMS, DEVICES AND METHODS FOR AUTHORIZING ENDPOINTS OF A PUSH PATHWAY

(75) Inventor: Brian Edward Anthony McColgan, Toronto (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 13/609,404

(22) Filed: Sep. 11, 2012

(65) Prior Publication Data

US 2014/0075515 A1   Mar. 13, 2014

(30) Foreign Application Priority Data

Sep. 11, 2012 (EP) ..................... 12183882

(51) Int. Cl.
| | |
|---|---|
| *G06F 7/04* | (2006.01) |
| *H04L 29/06* | (2006.01) |
| *H04L 12/18* | (2006.01) |
| *H04L 29/08* | (2006.01) |
| *H04W 12/06* | (2009.01) |

(52) U.S. Cl.
CPC ............ *H04L 63/08* (2013.01); *H04L 12/1859* (2013.01); *H04L 67/26* (2013.01); *H04W 12/06* (2013.01)

(58) Field of Classification Search
CPC . H04L 65/4061; H04L 12/1859; H04L 67/26; H04L 63/08
USPC .......................................................... 726/4
See application file for complete search history.

(56) References Cited

U.S. PATENT DOCUMENTS

| | | |
|---|---|---|
| 6,452,614 B1 | 9/2002 | King et al. |
| 2005/0265252 A1 | 12/2005 | Banerjee et al. |

(Continued)

FOREIGN PATENT DOCUMENTS

| | | |
|---|---|---|
| EP | 1976321 A1 | 10/2008 |
| EP | 2706727 | 3/2014 |

OTHER PUBLICATIONS

Co-pending U.S. Appl. No. 13/439,964, "Method, System and Apparatus for Managing Persona-based Notifications at a Communication Device", Filed Apr. 5, 2012.

(Continued)

*Primary Examiner* — Ashok Patel
*Assistant Examiner* — Gary Gracia
(74) *Attorney, Agent, or Firm* — Integral Intellectual Property Inc.; Miriam Paton; Amy Scouten

(57) ABSTRACT

An apparatus, system, and method for authorizing endpoints of a push pathway for push notifications are described herein. In one example embodiment, an identity provider element authenticates a first endpoint of the push pathway, determines an authentication token associated with the first endpoint, and determines a channel identifier in response to a successful validation of the authentication token associated with the first endpoint. In this embodiment, the identity provider element also authenticates a second endpoint of the push pathway, determines an authentication token associated with the second endpoint, and determines a handle for the push pathway in response to a successful validation of both the authentication token associated with the first endpoint and the authentication token associated with the second endpoint. The push pathway is established for transmission of push notifications from the first to the second endpoint upon establishing the handle for the push pathway.

20 Claims, 10 Drawing Sheets

(56) References Cited

U.S. PATENT DOCUMENTS

| | | | |
|---|---|---|---|
| 2006/0009981 | A1 | 1/2006 | Engstrom |
| 2006/0052091 | A1 | 3/2006 | Onyon et al. |
| 2006/0173959 | A1 | 8/2006 | McKelvie et al. |
| 2006/0251125 | A1* | 11/2006 | Goring et al. .............. 370/503 |
| 2009/0013387 | A1* | 1/2009 | Paas et al. .................... 726/5 |
| 2010/0106790 | A1* | 4/2010 | Shenfield .................. 709/206 |
| 2010/0161722 | A1* | 6/2010 | Jeon et al. ................. 709/203 |
| 2010/0227632 | A1 | 9/2010 | Bell et al. |
| 2011/0040895 | A1* | 2/2011 | Griffin et al. .............. 709/248 |
| 2011/0045806 | A1 | 2/2011 | Gupta et al. |
| 2011/0053574 | A1 | 3/2011 | Rice |
| 2011/0061008 | A1 | 3/2011 | Gupta et al. |
| 2011/0145063 | A1* | 6/2011 | Qureshi et al. ........... 705/14.52 |
| 2011/0173681 | A1* | 7/2011 | Qureshi et al. .................. 726/4 |
| 2011/0250909 | A1* | 10/2011 | Mathias et al. ............ 455/466 |
| 2011/0264800 | A1 | 10/2011 | Allred et al. |
| 2011/0283347 | A1* | 11/2011 | Bhuta et al. .................... 726/9 |
| 2012/0173610 | A1 | 7/2012 | Bleau et al. |
| 2012/0198268 | A1* | 8/2012 | Qureshi ........................ 714/4.1 |
| 2012/0198535 | A1* | 8/2012 | Oberheide et al. ............... 726/9 |
| 2012/0210415 | A1* | 8/2012 | Somani et al. .................... 726/9 |
| 2012/0239757 | A1* | 9/2012 | Firstenberg et al. ......... 709/206 |
| 2012/0278854 | A1* | 11/2012 | Ton et al. ........................ 726/3 |
| 2012/0311686 | A1* | 12/2012 | Medina et al. .................. 726/7 |
| 2013/0047034 | A1* | 2/2013 | Salomon et al. ............... 714/18 |
| 2013/0057695 | A1 | 3/2013 | Huisking |
| 2013/0061046 | A1* | 3/2013 | Joy et al. ...................... 713/162 |
| 2013/0268751 | A1 | 10/2013 | Preiss et al. |
| 2013/0297513 | A1* | 11/2013 | Kirillin et al. .................. 705/67 |

OTHER PUBLICATIONS

Extended European Search Report. European Application No. 12183882.5. Dated: Feb. 7, 2013.

Response. European Application No. 12183882.5. Dated: May 2, 2013.

Apple Inc., "Local and Push Notification Programming Guide", Aug. 9, 2011, Retrieved from the Internet: http://developer.apple.com/library/mac/documentation/NetworkingInternet/Conceptual/RemoteNotificationsPG/RemoteNotificationsPG.pdf [retrieved on Jan. 17, 2013].

Dan . . . @growl.Info: "Issue 426: Growl in a multi user environment does not behave as a user would expect", Jan. 27, 2012, pp. 1-2, XP055071805. Retrieved from the Internet: URL: http://code.google.com/p/growl/issues/detail?id=426 [retrieved on Nov. 4, 2013].

Office Action. U.S. Appl. No. 13/439,964. Dated: Dec. 6, 2013.

Document related to EP Application No. 12183882.5 dated Apr. 1, 2014 (Intent to Grant).

Document related to U.S. Appl. No. 13/439,964 dated Feb. 27, 2014 (Response to Office Action).

Document related to U.S. Appl. No. 13/439,964 dated Mar. 25, 2014 (Office Action).

Document related to U.S. Appl. No. 13/439,964 dated May 8, 2014 (Response to Office Action).

Document related to U.S. Appl. No. 13/439,964 dated May 14, 2014 (Applicant Initiated Interview Summary).

Document related to U.S. Appl. No. 13/439,964 dated Jun. 2, 2014 (Advisory Action).

Document related to U.S. Appl. No. 13/439,964 dated Jun. 25, 2014 (Request for Continued Examination).

Document related to CA Application No. 2,826,126 dated Jul. 25, 2014 (Office Action).

Document relating to European Patent No. 2,706,727, dated Sep. 11, 2014 (Patent Certificate).

* cited by examiner

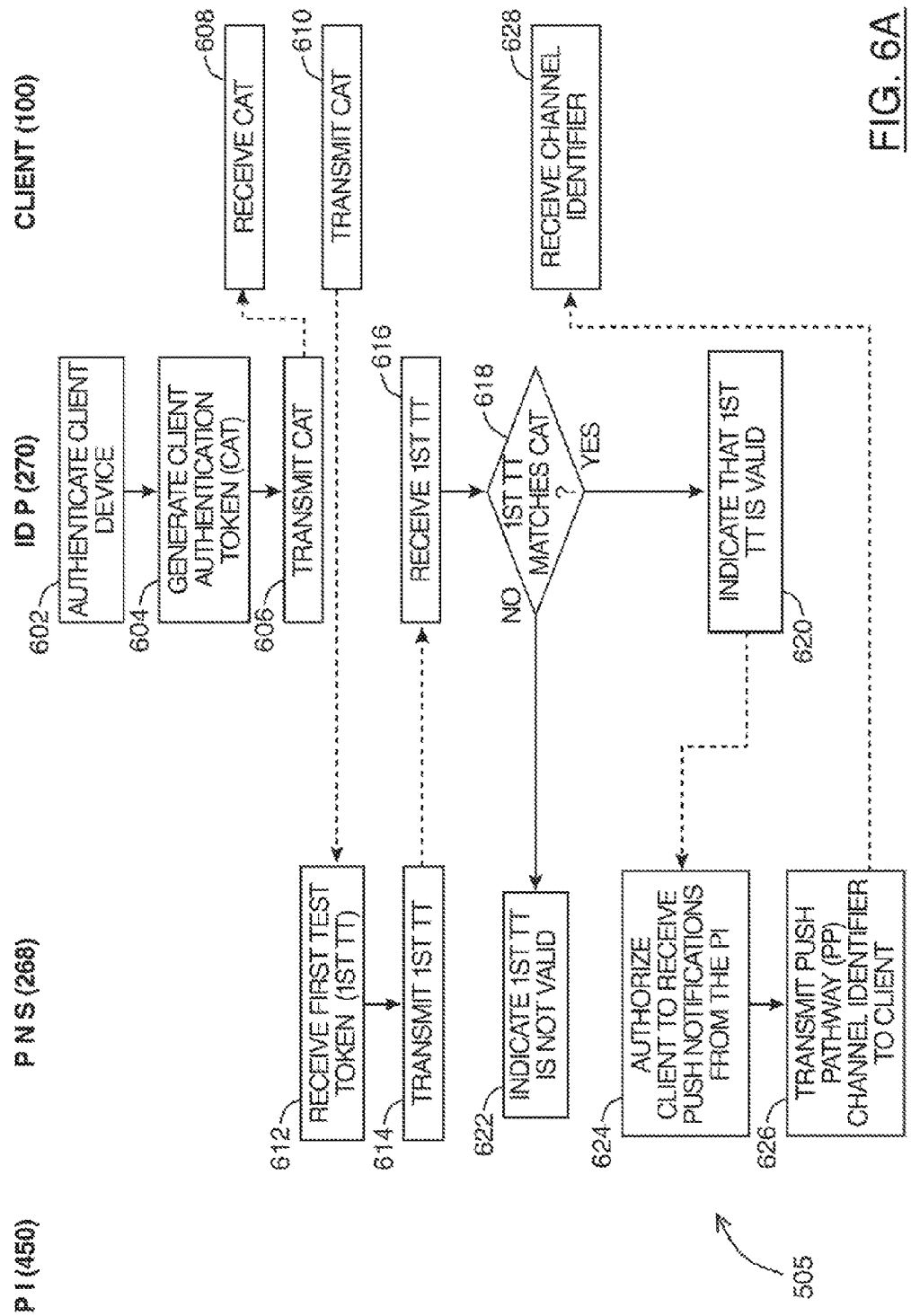

SYSTEMS, DEVICES AND METHODS FOR AUTHORIZING ENDPOINTS OF A PUSH PATHWAY

CROSS-REFERENCE TO RELATED APPLICATIONS

This application claims priority to European Patent Application No. EP 12183882.5, filed Sep. 11, 2012.

FIELD

Embodiments described herein relate generally to controlling the communication of push notifications between a push initiator element and a client device.

INTRODUCTION

In certain applications, "Push" notifications notify a client device when data becomes available at a push initiator element, for example. A push initiator element generally comprises any entity or service that is configured to provide push data (also referred to generally herein as "content") to other entities (e.g. computing devices, mobile communication devices). Typically, the entities that expect to receive data from the push initiator element are configured to receive such data after subscribing for content to be provided by the push initiator element.

As contrasted with systems in which the data is "pulled" from the push initiator element (e.g., where the client device initiates communication with the push initiator element directly to request data at the time the data is desired), the push initiator element "pushes" notifications to the client device when data is available. In this manner, the client device need not continuously poll the push initiator element to request data from the push initiator element.

BRIEF DESCRIPTION OF THE DRAWINGS

For a better understanding of the described embodiments and to show more clearly how they may be carried into effect, reference will now be made, by way of example, to the accompanying drawings in which:

FIG. 6A is a process flow diagram illustrating the interaction and sequence of events amongst a client device, a push notification server, and an identity provider element when authorizing a client device to receive push notifications from a push initiator element in a first phase associated with the client-initiated scenario, in accordance with one embodiment;

DESCRIPTION OF VARIOUS EMBODIMENTS

Figure 1:
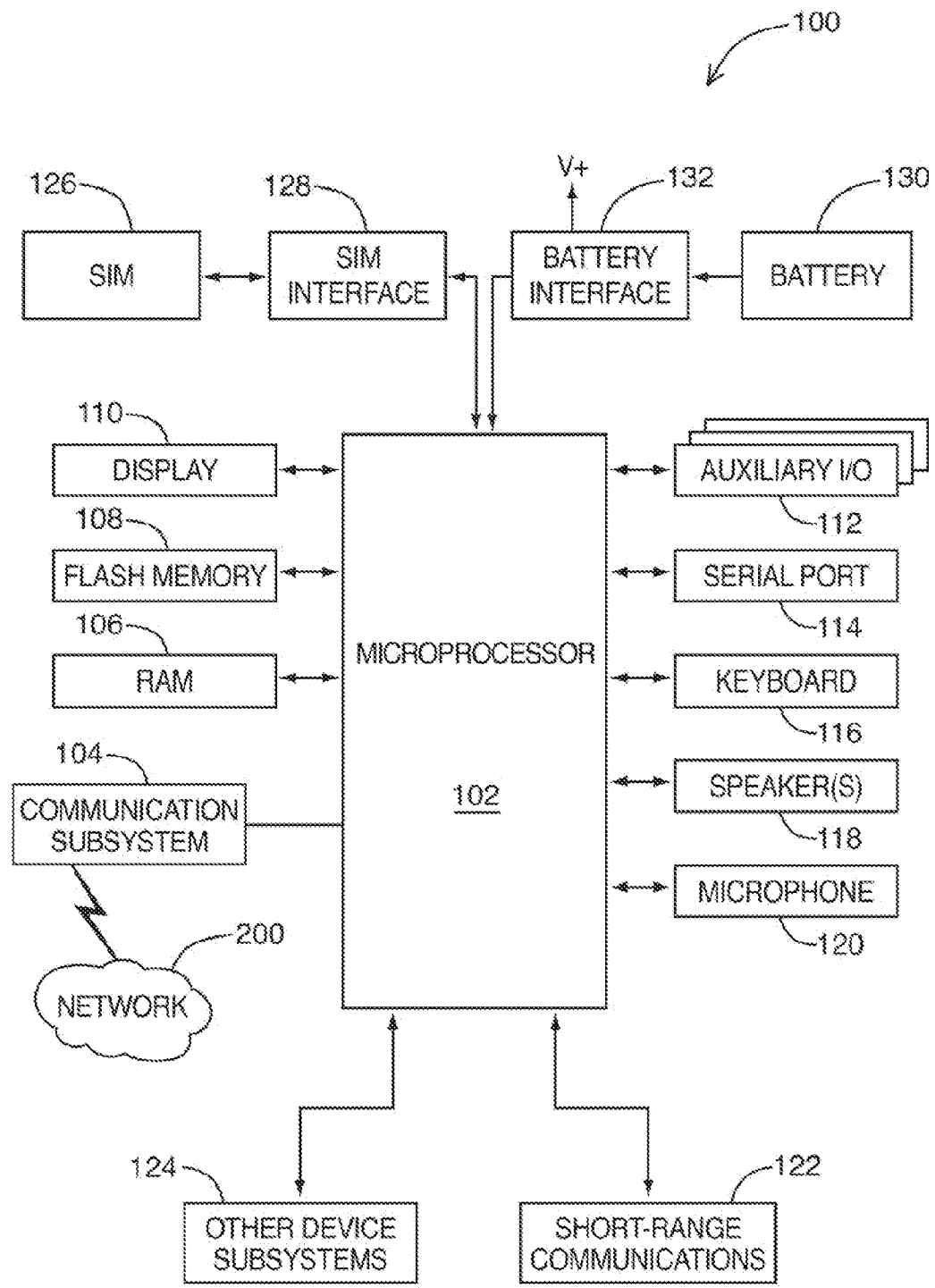
FIG. 1 is a block diagram of a mobile device in one example implementation.

Push notification servers may be configured to transmit a push notification to a client device prior to content, originating from a push initiator element, being pushed to the client device. A push notification generally comprises a transmission employed by a service element (e.g. a push notification service element) to initiate communication with an endpoint (e.g. a client device) on behalf of a push initiator (e.g. a content provider such as the NY Times). Push content generally comprises data or content originating from a push initiator element to be consumed or utilized in an application or service-specific manner by a client on one or more devices. For example, the NY Times daily-headlines service (i.e. a push initiator element) may deliver a daily headline summary (push content) to a subscriber (e.g. a client on one or more client devices). A push notification may itself include push content to be used at the recipient client device(s).

Push notification systems may employ a push notification server that is configured to coordinate the communication of push notifications (including or referencing push content) from a push initiator element to a client device. The push initiator element (PI) may be a network element or logical network service. The push initiator element may reside wholly or in part, on a device. The coordination is achieved by the creation of a push pathway having endpoints at each of the push initiator element and the client device. As used herein, the term "push pathway" generally refers to a logical connection established amongst at least a push notification server, a push initiator element, and a client device that enables the push notification server to control push notifications to be transmitted from the push initiator element to the client device. The devices and elements coupled to the push notification server, along with the push notification server itself, may also be collectively referred to as a push notification service (PNS) platform. As will be understood from the discussion that follows, a push pathway may be considered the result of a successful combination of a client device port number, with a correctly allocated channel identifier and handle, based on a validated token. Once all those constraints are in place, collectively, the push pathway is established, and push notifications of push content may proceed over the push pathway.

The endpoints of a push pathway may refer to software executing at the push initiator element and/or the client device that partakes in the communication of push notifications as described by the embodiments herein. For example, in some embodiments, the endpoint may comprise an application, process, thread or some other executable software module or software component that is configured to transmit or receive a push notification. In variant embodiments, the endpoints of a push pathway may additionally or alternatively include a hardware element.

Before a push pathway can be established, the push notification server authorizes each of the endpoints (e.g. the push initiator element that is to transmit the push notifications and/or the client device that is to receive the push notifications) that will operate to support the push notifications. The authorization of an endpoint to support push notifications may encompass various processes (e.g. verifying that a client device endpoint has a corresponding port which matches the referred-to token provided by the push initiator element). These processes, collectively, result in the creation of the logical push pathway, which is how a push notification can ultimately be transmitted (e.g. by a push initiator element) and received (e.g. by a client device).

When authorizing a particular device to receive push notifications, the push notification server may provide the device with a token for authentication purposes. The client device may then subsequently use this token to, for example, identify itself to a push initiator element and subscribe and/or request to receive push content (i.e. as push notifications to be transmitted from the push initiator element).

In some scenarios, tokens may be configured to expire after a given expiry period. Tokens are typically time-limited to prevent side-channel attacks. Unfortunately, if the token to be used by a given endpoint expires before the authorization and establishment of the other endpoint(s) in the push pathway is complete, then establishment of the push pathway may be delayed. Conventionally, the expiry of a token for one endpoint would trigger a re-initiation of an establishment process at all endpoints—that is from the beginning the process, which may include a client device re-establishing a port in order to be re-issued a token. This causes undue delays in establishing a push pathway, which can be time-consuming and result in a waste of processing resources, network bandwidth, etc.

Embodiments described herein do not require, for example, that a new token be re-issued by re-initiating the entire establishment process at all endpoints and re-establishing a port at each. Client devices also do not need to initiate a request for push notifications, by subscribing to or requesting push content from a push initiator element, for example.

Embodiments described herein make use of the functionality of an Identity Provider (IDP) element, which generally acts as a controller. The identity provider element may be provided on a computing device, comprising a memory and a processor. The identity provider element operates independently of the push notification server (and the various endpoints of the push pathway generally) and manages the process of establishing each of the endpoints of the push pathway for push notification services. The push initiator element utilizes the services of the push notification server, subject to control by the identity provider element, to push content to client devices over the push pathway. Control, in the context of the identity provider element, relates specifically to 'identifying' an endpoint (i.e. authenticating the client device or push initiator element) and authorizing and/or validating an endpoint instance to guarantee to the push notification server that a given endpoint may participate and complete a corresponding 'leg' of the push pathway as required. Various endpoints for a push pathway can be independently established for push notifications via the identity provider element, such that, for example, if re-authentication/authorization of one endpoint or leg of the push pathway is necessary at a certain point in time for example, it would not be necessary for all other endpoints of the push pathway to undergo re-authentication/authorization at that same time in order for the push pathway to be established.

For example, a token provided to a device by the push notification server may expire before the push pathway establishment process for that device/content is complete. Conventionally, as a part of the push pathway re-establishment process, a new token may have had to be issued. In contrast, in accordance with at least one embodiment described herein, re-establishing the push pathway for a given device using a new token for that client device may be managed and controlled by the identity provider element, without impacting other endpoints that may be undergoing other processes or legs that may have already been successfully established for push notifications. Further, the identity provider element, in some scenarios, may be able to re-issue a token without requiring a full re-authentication of the client device (e.g. wherein an identity provider element has determined that the client device still maintains a valid authentication).

As a further example, if a given endpoint needs to be periodically re-authenticated to maintain a push pathway that has already been established, for example, that given endpoint may be re-authorized for push notifications via the identity provider element from time-to-time, and therefore, undergo a re-authentication process independently of other legs and/or endpoints.

In general, establishing one leg/endpoint of a push pathway for push notifications need not trigger the re-establishment of a leg of all other endpoints, as only the endpoint that needs to be re-established may undergo re-authentication/authorization or content validation, as directed and controlled by the identity provider element. As previously noted, the re-establishing of endpoints of the push pathway may increase the processing burden (and thus decrease performance) at the push notification server. It may also delay or inhibit establishment of a push pathway. Therefore, establishing each endpoint independently of each other endpoint, as facilitated by the identity provider element, results in less overhead and an increased probability of successful push pathway establishment.

Furthermore, since the identity provider element generally operates independently of the push notification server (and other elements in the system), a compromised push initiator element or client device, or even a compromised push notification server, need not compromise the overall network or system. In at least one embodiment, all entities on the push pathway must be known to the identity provider element or the push pathway will not be realized, and as a result no push notifications can occur. In yet another embodiment, a compromised endpoint may be isolated (i.e. by the identity provider element) to ensure that, at a minimum, it is unable to participate in any further push notifications. Accordingly, the identity provider element plays a central role in establishing and maintaining a communication channel for push notifications, by managing the authenticity and authorization of endpoints, which may include authentication operations and/or the validation of content to be pushed over a resulting established push pathway.

In one broad aspect, there is provided a method of authorizing endpoints of a push pathway for push notifications, the endpoints comprising a push initiator element and a client device, wherein push notifications to be transmitted from the push initiator element to the client device over the push pathway are controlled by a push notification server, the method comprising: authenticating a first endpoint of the push pathway; in response to a successful authentication of the first endpoint, determining an authentication token associated with the first endpoint; determining, for the push notification server, a channel identifier in response to a successful validation of the authentication token associated with the first endpoint; authenticating a second endpoint of the push pathway; in response to a successful authentication of the second endpoint, determining an authentication token associated with the second endpoint; and determining a handle for the push pathway, wherein the handle is associated with the channel identifier and established in response to a successful validation of both the authentication token associated with the first endpoint and the authentication token associated with the second endpoint; wherein the push pathway is established for transmission of push notifications from the push initiator element to the client device upon establishing the handle for the push pathway.

In another broad aspect, the method is performed by at least one of an identity provider element or the identity provider element in association with the push notification server.

In another broad aspect, the first endpoint comprises the client device, the second endpoint comprises the push initiator element, and the authentication token comprises a client authentication token generated at the identity provider element in response to the successful authentication of the first endpoint.

In another broad aspect, the validating of the authentication token associated with the second endpoint and the establishing of the handle is responsive to a client-initiated subscription request.

In another broad aspect, the channel identifier is transmitted to the client device in response to the successful validation of the authentication token associated with the client device for a given port, and the client device transmits, to the push initiator element, the client authentication token, and the channel identifier to the push initiator element in the client-initiated subscription request.

In another broad aspect, the channel identifier is established in response to a channel creation request by the client device transmitted to the push notification server, and the channel creation request comprises at least one of the client authentication token, a port identifier, or an identifier for the push initiator element.

In another broad aspect, the first endpoint comprises the push initiator element, the second endpoint comprises the client device, and the authentication token comprises a push initiator element authentication token generated at the identity provider element in response to the successful authentication of the push initiator element.

In another broad aspect, the establishing of the handle is not responsive to a client-initiated subscription request for push notifications transmitted from the client device to the push initiator element, and the push initiator element transmits the channel identifier to the client device, and receives, from the client device, the authentication token associated with the client device.

In another broad aspect, the channel identifier is established in response to a channel creation request by the push initiator element transmitted to the push notification server, and the channel creation request comprises at least one of: the authentication token associated with the client device, a port identifier, or an identifier of the push initiator element.

In another broad aspect, the port identifier comprises a known port number associated with the client device.

In another broad aspect, at least one additional endpoint for the push pathway is to be successfully authenticated before the push pathway is established.

In another broad aspect, the push initiator element transmits data over the push pathway after establishing the push pathway.

In another broad aspect, at least one of the authentication token associated with the first endpoint or the authentication token associated with the second endpoint is configured to expire.

In another broad aspect, there is provided a system for authorizing endpoints of a push pathway for push notifications, the endpoints comprising a push initiator element and a client device, wherein push notifications to be transmitted from the push initiator element to the client device over the push pathway are controlled by a push notification server, and the system is configured to: authenticate a first endpoint of the push pathway; in response to a successful authentication of the first endpoint, determine an authentication token associated with the first endpoint; determine, for the push notification server, a channel identifier in response to a successful validation of the authentication token associated with the first endpoint; authenticate a second endpoint of the push pathway; in response to a successful authentication of the second endpoint, determine an authentication token associated with the second endpoint; and determine a handle for the push pathway, wherein the handle is associated with the channel identifier and established in response to a successful validation of both the authentication token associated with the first endpoint and the authentication token associated with the second endpoint; wherein the push pathway is established for transmission of push notifications from the push initiator element to the client device upon establishing the handle for the push pathway.

In another broad aspect, there is provided a computer-readable medium comprising instructions for execution by at least one processor, wherein the instructions when executed, authorize endpoints of a push pathway for push notifications, the endpoints comprising a push initiator element and a client device, wherein push notifications to be transmitted from the push initiator element to the client device over the push pathway are controlled by a push notification server, the instructions comprising: instructions for authenticating a first endpoint of the push pathway; instructions for determining, in response to a successful authentication of the first endpoint, an authentication token associated with the first endpoint; instructions for determining, for the push notification server, a channel identifier in response to a successful validation of the authentication token associated with the first endpoint; instructions for authenticating a second endpoint of the push pathway; instructions for determining, in response to a successful authentication of the second endpoint, an authentication token associated with the second endpoint; and instructions for determining a handle for the push pathway, wherein the handle is associated with the channel identifier and established in response to a successful validation of both the authentication token associated with the first endpoint and the authentication token associated with the second endpoint; wherein the push pathway is established for transmission of push notifications from the push initiator element to the client device upon establishing the handle for the push pathway.

In another broad aspect, there is provided an apparatus comprising: an identity provider for managing and controlling authentication of endpoints within a push notification service platform comprising at least one third-party service endpoint and at least one other endpoint, the identity provider comprising a memory and a processor configured to: authenticate each endpoint based on endpoint-provided credentials, wherein the credentials comprise at least one unique identifier corresponding to the third-party service endpoint, and identifiers which uniquely identify the at least one other endpoint; receive an allocate push-pathway request from one identified endpoint of said at least one other endpoint, wherein the request comprises an identifier corresponding to the third-party service endpoint, an authentication token, and a logical port identifier corresponding to the identified endpoint; process inputs to determine that the identified endpoint is authentic, to validate a specified push directionality, and to verify that the push notifications transmitted by the third-party service endpoint are authorized; in response to successfully processing the inputs, establishing a push pathway, the push pathway utilized as part of subsequent push notifications between the third-party service endpoint and said at least one other endpoint.

In another broad aspect, push notifications between the third-party service endpoint and said at least one other endpoint occur via a push notification server.

In another broad aspect, the push pathway is represented by a channel identifier.

In another broad aspect, the push pathway is represented by a handle.

In another broad aspect, for each of said at least one other endpoint, the push pathway is associated with a port at the endpoint.

Figure 2:
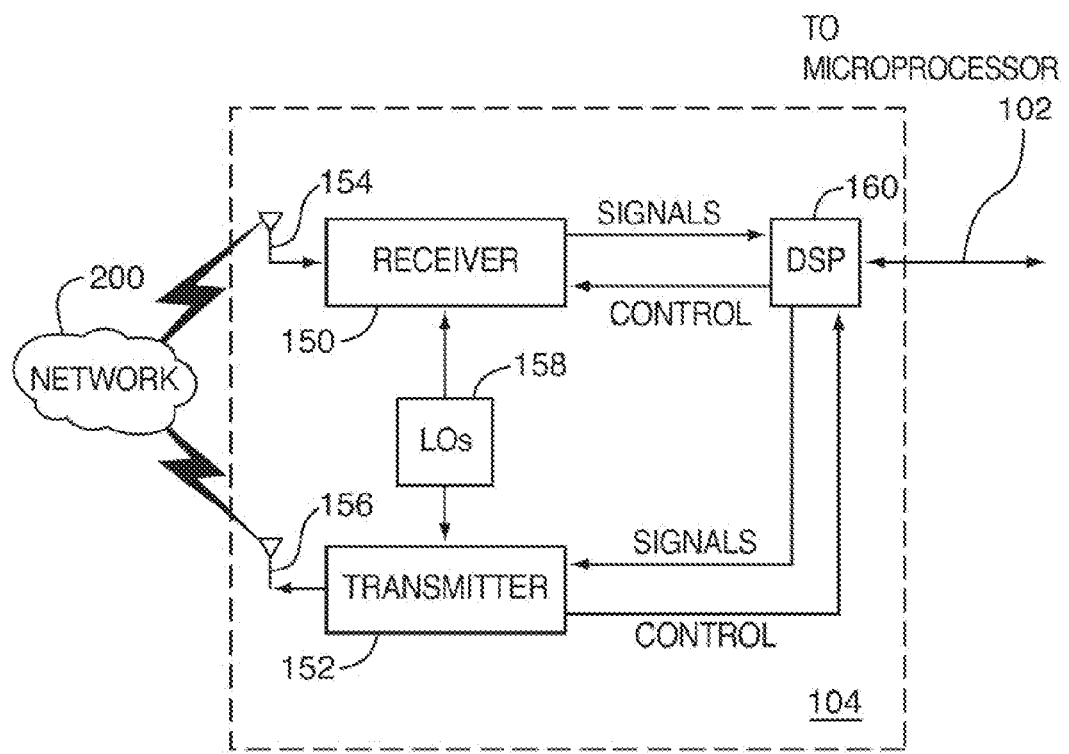
FIG. 2 is a block diagram of a communication sub-system component of the mobile device of FIG. 1.
Figure 3:
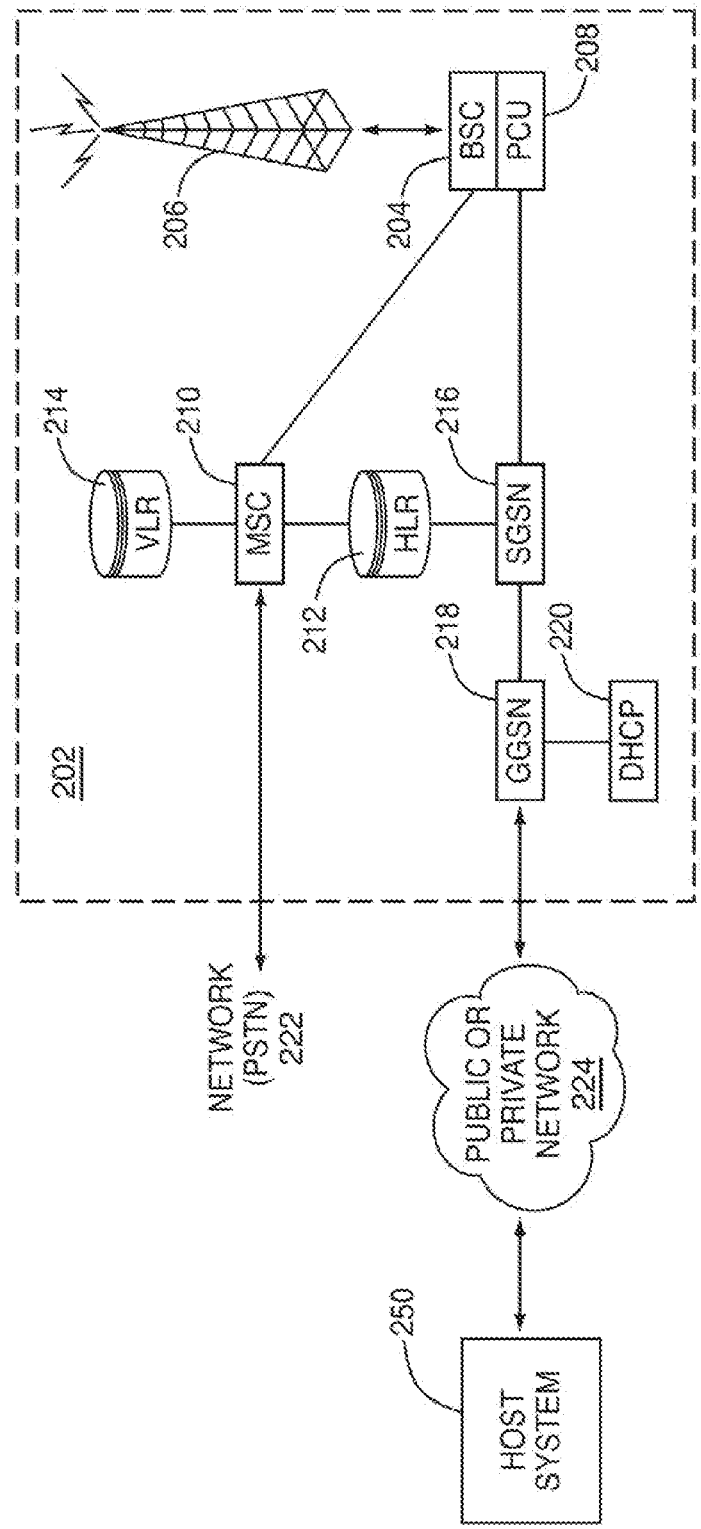
FIG. 3 is a block diagram of a node of a wireless network in one example implementation.

Reference is first made to FIGS. 1 to 3 for a general description of an example structure of a client device and how the client device operates and communicates with other devices. The client device (sometimes referred to alternatively as a "mobile device", "mobile station" or "portable electronic device") may comprise a two-way communication device with advanced data communication capabilities having the capability to communicate with other computer systems and devices. The mobile device may include the capability for voice communications, data communications or a combination of the two. Depending on the functionality provided by the mobile device, it may be referred to as a smartphone, a data messaging device, a two-way pager, a cellular telephone with data messaging capabilities, a wireless Internet appliance, a laptop computer, a tablet computer, a media player (such as an MP3 player), an electronic book reader, or a data communication device (with or without telephony capabilities) for example as those found in modern automobiles. Although a mobile device is described herein by way of illustration, embodiments described herein may be applicable to other computing devices other than mobile devices. For example, embodiments described herein may be applied to other computing devices and platforms that may be configured to receive push notifications in variant implementations.

Referring now to FIG. 1 specifically, a block diagram of a mobile device in one example implementation is shown generally as 100. Mobile device 100 comprises a number of components, the controlling component being microprocessor 102. Microprocessor 102 controls the overall operation of mobile device 100. In some embodiments, certain communication functions, including data and voice communications, are performed through communication subsystem 104. Communication subsystem 104 receives messages from and sends messages to a wireless network 200.

In this example implementation of mobile device 100, communication subsystem 104 may be configured for cellular communication in accordance with the Global System for Mobile Communication (GSM) and General Packet Radio Services (GPRS) standards. The GSM/GPRS wireless network is used worldwide and it is expected that other standards such as Enhanced Data GSM Environment (EDGE) and Universal Mobile Telecommunications Service (UMTS) may be employed. These standards are mentioned as examples only, and other standards may be employed on computing devices to which embodiments described herein are applied.

New standards are still being defined, but it is believed that they will have similarities to the network behavior described herein, and it will also be understood by persons skilled in the art that the described embodiments are intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

The wireless network associated with mobile device 100 may comprise a GSM/GPRS wireless network in one example implementation of mobile device 100; however, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and n-generation (e.g. 2.5G, 3G, 3.5G, 4G, etc.) networks like EDGE, UMTS, High-Speed Downlink Packet Access (HSDPA), High-Speed Uplink Packet Access (HSUPA), High-Speed Packet Access (HSPA), and Long Term Evolution (LTE), etc. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Mobile device 100 will typically have a device identifier (e.g. an International Mobile Equipment Identity—IMEI) or some other identifier (e.g. a PIN) associated with it. These identifiers may be provisioned or established with the device at the time of manufacture, for example.

Microprocessor 102 also interacts with additional subsystems such as a Random Access Memory (RAM) 106, flash memory 108, display 110, auxiliary input/output (I/O) subsystem 112, serial port 114, keyboard 116, one or more speakers 118, microphone 120, short-range communication subsystem 122 and other device subsystems 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator, media player or task list. Operating system software executed or carried out by microprocessor 102 is typically stored in a persistent store such as flash memory 108, which may alternatively be a read-only memory (ROM) or similar storage element (not shown). Those skilled in the art will appreciate that the operating system, specific device applications (illustrated as applications 402 in FIG. 4A, below), or parts thereof, may be temporarily loaded into a volatile store such as RAM 106 to be run or executed by microprocessor 102.

In some embodiments, mobile device 100 may send and receive communication signals over network 200 after required network registration or activation procedures have been completed. Network access is associated with a subscriber or user of a mobile device 100. To identify a subscriber, mobile device 100 may require a Subscriber Identity Module or "SIM" card 126 to be inserted in a SIM interface 128 in order to communicate with a network 200. SIM 126 is one type of a conventional "smart card" used to identify a subscriber of mobile device 100 and to personalize the mobile device 100, among other things. Without SIM 126, mobile device 100 may have limited ability for communication with network 200.

By inserting SIM 126 into SIM interface 128, a subscriber can access all subscribed services. Services may include: telephony, web browsing and messaging such as e-mail, voice mail, Short Message Service (SMS), media transfers (such as music downloading or streaming), and Multimedia Messaging Services (MMS). More advanced services may include: the Rich Communications service-Suite ('RCS' or 'joyn' as defined by the GSM Association) point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that subscribers are not necessarily bound by any single physical mobile device. SIM 126 may store additional subscriber information for a mobile device as well, including an address book, datebook (or calendar) information and recent call information. In certain embodiments, SIM 126 may be a different type of user identifier and may be integral to mobile device 100 or not present at all. By way of further examples, a Universal Integrated Circuit Card (UICC), eUICC (Embedded UICC), Removable User Identity Module (R-UIM), CDMA Subscriber Identity Module (CSIM), or Universal Subscriber Identity Module (USIM) may be employed.

Mobile device 100 may include a power pack that supplies power to electronic components and that supports portability and/or mobility. The power pack may be of any type, but in various embodiments, mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed in flash memory 108 (or other non-volatile storage) on mobile device 100 during its manufacture.

Additional applications may also be loaded onto mobile device 100 through network 200, auxiliary I/O subsystem 112, serial port 114, short-range communications subsystem 122, or the other device subsystems 124. This flexibility in application installation increases the functionality of mobile device 100 and may provide enhanced on-device functions, communication-related functions, or both. For example, secure communication applications may enable electronic commerce functions and other such financial transactions to be performed using mobile device 100. Numerous other types of applications may be loaded onto mobile device 100 or other computing devices, including without limitation, messaging applications (e.g. e-mail, text, instant message, video chat, etc.), voice communication applications, calendar applications, address book applications, utility applications, browser application, media player (e.g. audio, video, etc.) applications, social network applications, camera applications, gaming applications, entertainment applications, productivity applications, software distribution applications, etc.

Serial port 114 enables a subscriber to retrieve and set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Preferences like 'private keys' or a 'seed value(s)' used in private keys (e.g. as generated by an identity provider element) may be provisioned through serial port 114, or through network 200, for example. Open Mobile Alliance Device Management (DM) services with an appropriate management authority (e.g. the Service Provider or Mobile Network Operator) bootstrapping preferences may be utilized, for example.

It should be noted that the term "download" and forms thereof as used herein, are used generally to describe a transfer of data from one system to another, and is not intended to be limiting with regards to the origin or destination of the transfer, for example. Accordingly, where the term "download" and forms thereof are used in the specification and in the claims, it is intended to encompass other forms of transfers including, for example, an "upload" or a "sideload" of data (e.g. a Universal Serial Bus (USB) sideload).

Short-range communications subsystem 122 provides for wireless device connections to enable communication between mobile device 100 and different systems or devices, with or without the use of network 200. For example, subsystem 122 may include an infrared device and associated circuits and components for short-range communication. Examples of short range communication would include standards developed by the Infrared Data Association (IrDA), Near Field Communication (NFC), Bluetooth, and the 802.11 family of standards developed by IEEE.

In use, a received signal such as a text message, an e-mail message, or web page fetch/download from network 200 will be processed by communication subsystem 104 and input to microprocessor 102. Microprocessor 102 will then process the received signal for output to display 110 or alternatively to auxiliary I/O subsystem 112 or flash memory 108. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, infrared fingerprint detector, a digital stylus or pen, or a roller wheel with a dynamic button pressing capability. Further, auxiliary I/O subsystem 112 may comprise a two-dimensional navigation (or scrolling) component, such as a track ball, a joystick or a directional pad, each optionally with a dynamic button pressing capability. Keyboard 116 may comprise an alphanumeric keyboard and/or telephone-type keypad. A composed item may be transmitted over network 200 through communication subsystem 104.

For voice communications, the overall operation of mobile device 100 is substantially similar, except that the received signals would be output to the one or more speakers 118, and signals for transmission would be generated by microphone 120. Alternative voice or audio I/O subsystems, such as a voice message recording subsystem, may also be implemented on mobile device 100. Although voice or other audio signal output is accomplished primarily through the one or more speakers 118, display 110 may also be used to indicate additional information such as the identity of a calling party, duration of a voice call, or other voice call related information. Microphone 120 can receive a supply of power, in the form of a bias voltage and bias current, from the rechargeable battery 130. Different types and configurations of microphone 120 can be incorporated into the mobile device 100.

Referring now to FIG. 2 specifically, a block diagram of the communication subsystem 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that should be conserved, typically due to limits in overall bandwidth and limited battery power of mobile device 100.

When mobile device 100 is fully operational, transmitter 152 is typically keyed or turned on only when it is sending to network 200 and may be otherwise turned off to conserve resources. Similarly, receiver 150 is periodically turned off to conserve power until it is needed to receive signals or information (if at all) during designated time periods.

Referring now to FIG. 3 specifically, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

For example, one or more push initiator elements may reside in a node 202. Further, a push notification service (described herein as being provided by a push notification server in example embodiments) and/or the identity provider element may reside in a node 202.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network 200, permanent configuration data such as a user profile is stored in HLR 212. HLR 212 typically also contains location information for each registered mobile device and can be queried to determine the current location of a mobile device. MSC 210 is responsible for a group of location areas and stores the data of the mobile devices currently in its area of responsibility in VLR 214. Further VLR 214 may also contain information on mobile devices that are visiting from other networks. The information in VLR 214 includes part of the permanent mobile device data transmitted from HLR 212 to VLR 214 for faster access. By moving additional information from a remote HLR 212 node to VLR 214, the amount of network-to-network traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 may have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 typically performs a "GPRS Attach" to acquire an IP address and to access data services. This requirement is not present in circuit switched voice channels as Integrated Services Digital Network (ISDN)

addresses are used for routing incoming and outgoing calls. GPRS capable networks may use private, dynamically assigned IP addresses, employing a DHCP server 220 connected to the GGSN 218. There are many mechanisms for dynamic IP assignment, including using a combination of a Remote Authentication Dial-In User Service (RADIUS) server and DHCP server.

Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 is assigned to one or more APNs and mobile devices 100 generally cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are typically a limited number of these available in the network 200. To maximize use of the PDP Contexts, network 200 will run an idle timer for each PDP Context to determine if there is a lack of activity. When a mobile device 100 is not using its PDP Context, the PDP Context can be de-allocated and the corresponding IP address returned to the IP address pool managed by DHCP server 220.

The public or private network 224 may also provide access to a host system 250.

Figure 4A:
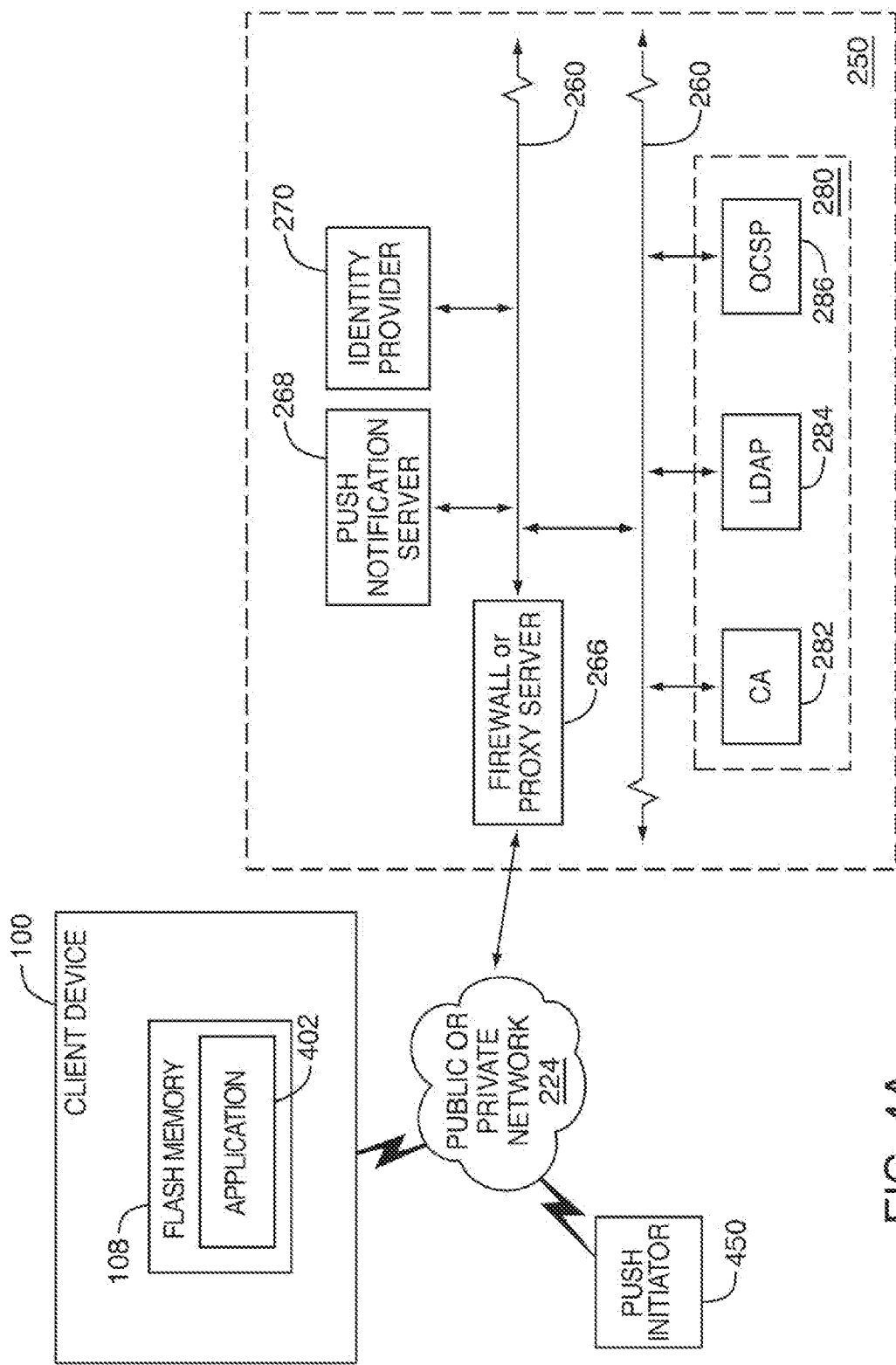
FIG. 4A is a block diagram illustrating components of a host system in one example configuration.

Referring now to FIG. 4A, a block diagram illustrating components of a host system in one example configuration is shown. Host system 250 will typically include a number of servers executing applications that provide services accessible by a push initiator element and/or the client device 100. For example, these services may include platform services provided by the manufacturer of the operating system that executes on the client device 100. In various embodiments, however, the host system 250 may comprise a corporate office or other local area network (LAN), or a home office computer or some other trusted system, for example.

Embodiments described herein relate generally to establishing endpoints of a push pathway between at least a push initiator element 450 and a client device 100. Accordingly, only a subset of network components of host system 250 are shown in FIG. 4A for ease of exposition, and it will be understood by persons skilled in the art that host system 250 will comprise additional components not explicitly shown in FIG. 4A, for this example configuration. More generally, host system 250 may represent a smaller part of a larger network [not shown], and may comprise different components and/or be arranged in different topologies than that shown in the example of FIG. 4A.

In this example, mobile device 100 communicates with host system 250 through shared network infrastructure 224 such as a service provider network or the public Internet. Access to host system 250 may be provided through one or more routers [not shown in FIG. 4A], and computing devices of host system 250 may operate from behind a firewall or proxy server 266.

Secure communication protocols may rely on public and private encryption keys to provide confidentiality and integrity, and on a Public Key Infrastructure (PKI) to communicate information that provides authentication and authorization (e.g. secure communication protocols may be applied to the transmission of tokens as discussed below). Data encrypted using a public key of a private key/public key pair can only be decrypted using the corresponding private key of the pair. Private key information is kept private, whereas public key information is shared.

For example, if a sender wishes to send a message to a recipient in encrypted form, the recipient's public key is used to encrypt the message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. Generally, a digital signature generally involves generating a digest of the message (e.g. a hash of the message), and using the sender's private key; the resulting signature can then be appended to the outgoing message. The recipient uses the same technique as the sender (e.g. using the same standard hash algorithm) to obtain a digest of the received message. The recipient also uses the sender's public key to verify the digital signature, in order to obtain what should be a matching digest for the received message. If the digests of the received message do not match, this suggests that either the message content was changed during transport and/or the message did not originate from the sender whose public key was used for verification. By verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The "messages" being encoded are not limited to any particular type of message, and any data in general may be encoded using public key techniques.

For a public key to be trusted, its issuing organization must be trusted. The relationship between a trusted CA and a user's public key can be represented by a series of related certificates, also referred to as a certificate chain. The certificate chain can be followed to determine the validity of a certificate.

Certificate servers store information about certificates and lists identifying certificates that have been revoked. These certificate servers can be accessed to obtain certificates and to verify certificate authenticity and revocation status. For example, a Lightweight Directory Access Protocol (LDAP)

server may be used to obtain certificates, and an Online Certificate Status Protocol (OCSP) server may be used to verify certificate revocation status.

Certificates can be obtained from a number of sources, for storage on push initiator element 450 and/or mobile devices (e.g. client device 100). These certificate sources may be private (e.g. dedicated for use within an organization) or public, may reside locally or remotely, and may be accessible from within an organization's private network or through the Internet, for example. In the example shown in FIG. 4A, multiple PKI servers 280 reside on host system 250. PKI servers 280 include a CA server 282 for issuing certificates, an LDAP server 284 used to search for and download certificates (e.g. for identities associated with the push notification server 268 and/or the push initiator element 450), and an OCSP server 286 used to verify the revocation status of certificates. In variant embodiments, the identity provider element 270 may also function in the role of a Certificate Authority, and thus may independently maintain or have access to its own PKI servers (e.g. a CA server, LDAP server, and/or an OCSP server), or the functionality of these PKI servers may integrated into the identity provider element 270.

Certificates may be retrieved from LDAP server 284 in a number of ways. For example, LDAP server 284 may be accessed directly (i.e. "over the air" in this context) by mobile device 100, and mobile device 100 may search for and retrieve individual certificates through a mobile data server [not shown]. Similarly, mobile data server may be adapted to allow mobile device 100 to directly query OCSP server 286 to verify the revocation status of certificates.

Other sources of certificates [not shown] may include a Windows certificate store, another secure certificate store on or outside LAN 250, and smart cards, for example.

Embodiments described herein relate generally to the authorization of endpoints of a push pathway for push notifications originating from at least one push initiator element. Authorization of an endpoint of the push pathway may be achieved by way of a sequence of interactions amongst a push initiator element 450, a push notification server 268, an identity provider element 270 and/or a client device (e.g. mobile device 100 or an application executing thereon).

Furthermore, in variant embodiments, while not shown explicitly in the Figures for ease of exposition, additional elements may be incorporated, and each additional element for the push pathway may need to be authenticated and authorized in order for the push pathway to be established. The push pathway is the logical element holding together all components ("legs") of the transmission path, based on each component having their required constraints (e.g. authentication of its identity, validation of content to be transmitted and/or received, etc.) being fulfilled.

Client applications 402 executable on mobile device 100 may comprise any software application or executable software module capable of receiving push content from a push initiator element 450 by way of a push notification. As discussed, some example client applications include a news reader program, a messaging program (e.g., electronic-mail, instant messaging, provisioning, configuration, etc.), games, social media, or any other type of application that is configured to receive push content from the push initiator element 450.

A push initiator element 450 may comprise any device or element configured to provide push notifications (including or referencing push content) to client application 402 executing on a mobile device 100. In various embodiments, the push initiator element 450 may host one or more server applications that can be configured to provide the subscribed-for or requested "push content" of the push notification to client application 402. If the client application 402 is a news reader program, the "content" may include a newly-published news article. Alternatively, for example, if the client application 402 is a messaging application, the "content" may include a received e-mail message or instant message. The content may comprise "new" content (e.g. net-new information, not previously transmitted to the particular client application 402 on mobile device 100, or content that has been recently created), or it may comprise "old" or "existing" content (e.g. for recall notifications directed to messages previously transmitted or having been created between two historical dates). The client application 402 on mobile device 100 is referred to herein generally as a "client device".

As illustrated, the push initiator element 450 may be external to the host system 250. Accordingly, a push initiator element 450 may also be referred to generally as a third-party service endpoint of the push notification service platform. Whether the push initiator element 450 is external or internal to the host system 250, the push initiator element is typically authenticated with identity provider element 270 before the push initiator element is authorized (i.e. capable) to transmit push notifications.

An example of a push initiator element 450 may include a component of a software provisioning/update server that may be provided as part of the platform services associated with the manufacturer of the operating system and/or applications that execute on the client device 100. The software provisioning/update server may, for example, be configured to issue critical software patches or emergency messages to a subset of mobile devices 100. It should be noted, in this example, that push content would be established using a pre-provisioned port on client device 100 or a port on which the user of client device 100 has accepted as being for use to receive software patches. As will be described below, an explicit request or subscription for these update services need not be made by client devices 100.

The push notification server 268 may comprise an internal network server of the host system 250 configured to control the push notifications that are to be communicated from the push initiator element 450 to the client device 100. In variant embodiments, the application server 268 may be part of a remote system (i.e. not part of the host system 250) that is accessible by the push initiator element 450 and the client device 100 via the public or private network 224.

In the described embodiments, the push notification server 268 is also configured to communicate with the identity provider element 270 to allow the push notification server 268 to delegate certain tasks (e.g. authorization and possibly validation) to the identity provider element 270. There may also be a 'level of trust' between the push notification server 268 and the identity provider element 270. For example, if the push notification server 268 exists outside of host system 250, then a trust relationship may be established as a result of a signed agreement governing the operations of push notification server 268 and identity provider element 270; on the other hand, if both the push notification server 268 and the identity provider element 270 are within the same physical network and/or administered by the same entity, a trust relationship may be presumed. In an analogous manner, it will be understood that there may also be a trust relationship established between the push notification server 268 and/or the identity provider element 270, and the push initiator element 450.

The identity provider element 270 may be implemented in any suitable device or other component capable of communicating with each of the client device 100, the push initiator element 450 and the push notification server 268. While illustrated as being within the host system 250, in variant embodiments, the identity provider element 270 may be implemented on a device that is external from the host system 250.

An identity provider element 270 (or any element in general) may comprise a service element that typically exists or is deployed in a network (e.g. a wireless network as shown in FIG. 3). Furthermore, a service element (such as the identity provider element) can be deployed on a single computing node, or in a logical combination of one or more computing nodes within a mobile network (FIG. 3). Furthermore, a service element may extend (either in whole or in part) to a computing device (e.g. a mobile wireless smartphone or tablet), comprising a memory and a processor, as detailed by way of example in FIG. 1.

Generally, the identity provider element 270 may execute software that is capable of authenticating the identity of various entities and performing other functions in the establishment of a push pathway. For example, as discussed in greater detail below, when authenticating the endpoints for use in establishing a push pathway, the identity provider element 270 may be configured to authenticate identities associated with users of the client device 100 and/or an organization operating the push initiator element 450, for example. Endpoints are authenticated based on endpoint-provided credentials, where the credentials typically include at least one unique identifier that corresponds to the endpoint, and at least one identifier that uniquely identifies at least one of the other endpoints of the push notification service platform. In response to a successful authentication, an authentication token may then be generated and returned to the corresponding authenticated device. The authenticated device may subsequently transmit the authentication token received by identity provider element 270 to the push notification server 268.

The identity provider element 270 is configured to perform other functions as well. For example, the identity provider element 270 may be used (e.g. by the push notification server 268 at the request of the client device 100 or the push initiator element 450) to help establish a channel identifier for the push pathway. A channel identifier is used to identify a channel; it generally refers to the means by which a push notification server transports push notifications toward a logical port of client devices. Further, the identity provider element 270 may be used by the push notification server 268 on behalf of push initiator element 450, to assist in establishing a handle for the push pathway, which is generated based on the channel identifier and a valid authentication token of client device 100. A handle represents a logical entity (analogous to a port) from the perspective of the push initiator element 450. A handle is utilized by the push initiator to initiate the push of content toward client device 100. Notably, if the handle (or if the channel identifier, or port) is not successfully created, then a push pathway does not exist, and as a result the push initiator element 450 will be unable to send push notifications to the client device 100.

To ensure secure communication of security credentials and/or authentication tokens, the public key encryption techniques described above or other techniques may be employed, and the identity provider element 270 may have access to PKI servers (e.g. PKI servers 280 or other PKI servers) as a result. It will be understood that any, some or all of the communications illustrated in the Figures described below may be encrypted.

As previously noted, the term "push pathway" may be understood to include or comprise a logical connection that can be established amongst a push initiator element 450, a push notification server 268, and a client device 100 (and potentially other endpoints) that allows the push notification server 268 to control push notifications transmitted from the push initiator element 450 to the client device 100. In its basic form, the push pathway may be established having at least two endpoints: a first endpoint at one of a push initiator element and a client device, and a second endpoint at the other of the push initiator element and the client device. When the push pathway is successfully established, push notifications may then be controlled by a push notification server, and the push notifications (or push content generally) are sent or issued from the push initiator element to the client device over the established push pathway.

Figure 4B:
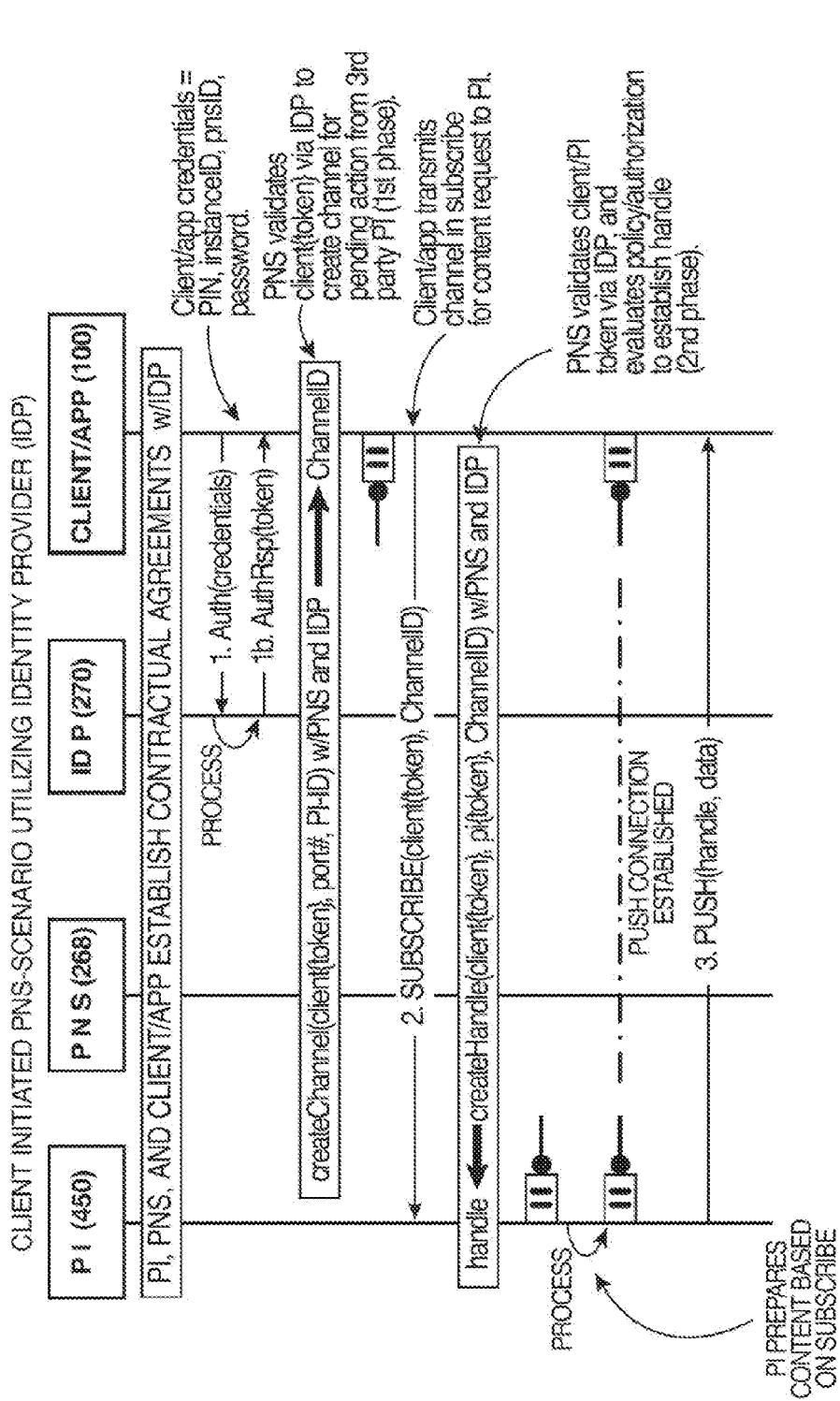
FIG. 4B is a block diagram illustrating interactions between components in the establishment of a push pathway in a client-initiated scenario, in accordance with at least one embodiment.

Referring to FIG. 4B, shown there is a block diagram illustrating interactions between components in the establishment of a push pathway in a client-initiated scenario, in accordance with at least one embodiment. For ease of reference, the following abbreviations are shown in FIG. 4B, and will be used in the examples: push initiator element (PI) 450, push notification server (PNS) 268, and identity provider element (IDP) 270.

In various embodiments, operations of both the PNS 268 and the PI 450 may be governed by contractual relationships with the IDP 270. This relationship may be established outside of the flows illustrated. This contractual relationship may include the establishment, by the IDP, of a public key based on the identities associated with the PNS, and PI and respective shared secrets. Furthermore, as previously noted, the IDP may also function in the role of a Certificate Authority.

FIG. 4B illustrates a scenario that utilizes an IDP 270 wherein the client device 100 (or more specifically, an application executing on the client device) requests or subscribes for content from a service provider, namely PI 450.

As illustrated, a client initiated PNS-scenario begins in step #1 of FIG. 4B, where a client device 100 authenticates with an IDP 270. This authentication step may be as a result of accessing a specific resource or due to client registration procedures being performed, for example. To authenticate, the client 100 may provide credentials to the IDP 270. These credentials may include a PIN (e.g. a device PIN), an instance identifier (e.g. which is used to identify a client/application lifecycle), the identifier of the PNS 268, and/or a password or other authentication data, such as biometric data. Other information may be provided to the IDP as well. In step #1b, if the client-provided credentials correctly match expected values, the IDP 270 responds to the client application 100 with an authentication token, otherwise, the authentication token is generally not provided to the client application 100. This authentication token may incorporate a "time-to-live" (i.e. the authentication token may expire after a certain time period has passed) to indicate when a client device 100 may need to re-register with the IDP 270. Prior to performing this authentication, the client device 100 may have already identified a logical port number identifying a port through which push notifications are to be received.

In the illustrated example, the establishment of the push pathway may then proceed in multiple phases: a first phase leading to the creation of a channel identifier for transmission via PNS 268 to the client device 100, and a second phase to establish a handle at the push initiator element 450.

As part of the first phase, the client device 100 requests creation of a channel identifier from the PNS 268 by transmitting an "allocate push-pathway request", which is received by the PNS 268, which passes the request off to the IDP 270, thereby delegating processing to the IDP 270. The IDP 270 will receive the "allocate push-pathway request" (also referred to generally herein as a channel creation request). This processing is represented by the rectangle following step #1b in FIG. 4B. During this first phase, the PNS 268 receives (from a client device 100) as part of the request, a client authentication token, and other data such as the logical port number corresponding to the client device 100, and an identifier for the PI 450 (e.g. a third-party service endpoint identifier). The PNS 268, with support from the IDP 270, validates the token.

Validation by IDP 270 may include verifying that the device PIN and token correctly correspond to client device 100 and the user of client device 100. Validation may also comprise determining that a specific push directionality is correct. For example, 'directionality' is identified based on the origin of the channel creation request (if the token was not for a client device 100, but erroneously for a PI 450 for example), and the IDP 270 may decline allocating a channel identifier if the directionality is not successfully validated.

In one embodiment, IDP 270 will first attempt to determine whether the token received for a client device matches the token that IDP 270 originally created when the user/client device was previously authenticated. If there is a match, then IDP 270 can proceed and check other aspects, such as directionality as noted above. Furthermore, it may be possible that PI 450 has notified IDP 270—for example—that all client/devices from a specific domain (e.g. 'example.org') are NOT permitted to receive content. As a result, the IDP 270 may evaluate a policy or authorization data as part of the validation process, and in response, determine that push notifications are not permitted to be sent to the client device, such that a channel identifier is not allocated and returned back to the PNS 268 (and ultimately to client device 100). In another embodiment, the 'policy decision' to block all devices from the specific domain (e.g. 'example.org') may be at the discretion of the PNS 268 (instead of PI 450). The net result may, however, be the same (i.e. no channel identifier is allocated).

If the validation is successful, PNS 268 establishes and returns a channel identifier to the client device 100 in response to the channel creation request; otherwise, the channel identifier is generally not provided to the client device 100.

PI 450 may comprise a Service Provider (SP) federated with the IDP 270 but may operate either within or outside of a 'circle of trust'. For example, the NY Times 'news ticker' service may be considered a PI 450, and may interoperate with an IDP 270 as part of network domain/infrastructure namespace. In other examples, the SP may truly be associated with a third-party, and the SP element may reside (physically and/or logically) outside of a 'circle of trust'. The PI 450 may utilize the PNS 268 to help it push data toward the client device 100.

A client device 100 can then convey a channel identifier to a service provider (e.g. NY Times 'news ticker' service) to receive or subscribe for push content. As illustrated, in step #2, the client device 100 subscribes to the PI 450 (e.g., NY Times) and includes a client authentication token and channel identifier (created in previous steps) to the PI 450. The subscription request may also include information pertaining to 'what to send' (e.g. data identifying properties of content to be pushed to the client device).

Optionally, a subscribe request may generate a subscribe response or subscribe acknowledgement (not shown in FIG. 4B) that is provided to the client device 100 by the PI 450.

The service provider (e.g., PI 450) receiving a subscribe request (shown in step #2) processes the request on behalf of the client device 100. This processing may include determining the push content being subscribed to.

Processing steps may also include initiating the second phase in which a handle is fetched or requested from the PNS 268 in order to send push content to the client device 100. This second phase is shown as the rectangle beneath step #2 in FIG. 4B.

The PNS 268 receives a direction from the PI 450 to establish the handle, and verifies authentication tokens of both the client and the service provider received via the IDP 270 (the PI 450 is assumed to have previously authenticated with the IDP in a manner similar to the authentication performed for the client device 100).

The PNS 268 may also execute additional validation steps to evaluate whether a client device 100 and/or the PI 450 is authorized to make use of the established handle. Some validation acts, which may be analogous to acts performed by the IDP 270 as previously described with respect to the allocation of channel identifiers, may also be performed before a handle is to be established. For example, the correct push directionality may be verified (e.g. checking that the authentication token corresponding to a service provider originates from PI 450 and not a client device). Additional validations may also involve policy-based determinations such as whether the user of client device 100 is of a certain age, or whether the PI 450 belongs to a domain that is permitted to transmit content. Some or all of these acts may be delegated to and performed by IDP 270. Once these validation steps are successfully executed, the handle is sent back to the PI 450.

In certain embodiments, a logical handle utilized by the PI 450 as a component of a push pathway may be represented by, for example, a file-handle which may encapsulate a network/IP connection between the PI 450 and client device 100. In another embodiment, the logical handle may represent a connection which is proxied by another entity (e.g. the PNS itself).

The PI 450, having received a valid handle, may now initiate the pushing of content corresponding to the subscription for a client device 100. The PI 450 uses the logical handle which is connected to the channel identifier (i.e. to formulate a push pathway), to issue a push of data (step #3) to the client device 100. Accordingly, the push pathway is represented by both a channel identifier and a handle.

Figure 4C:
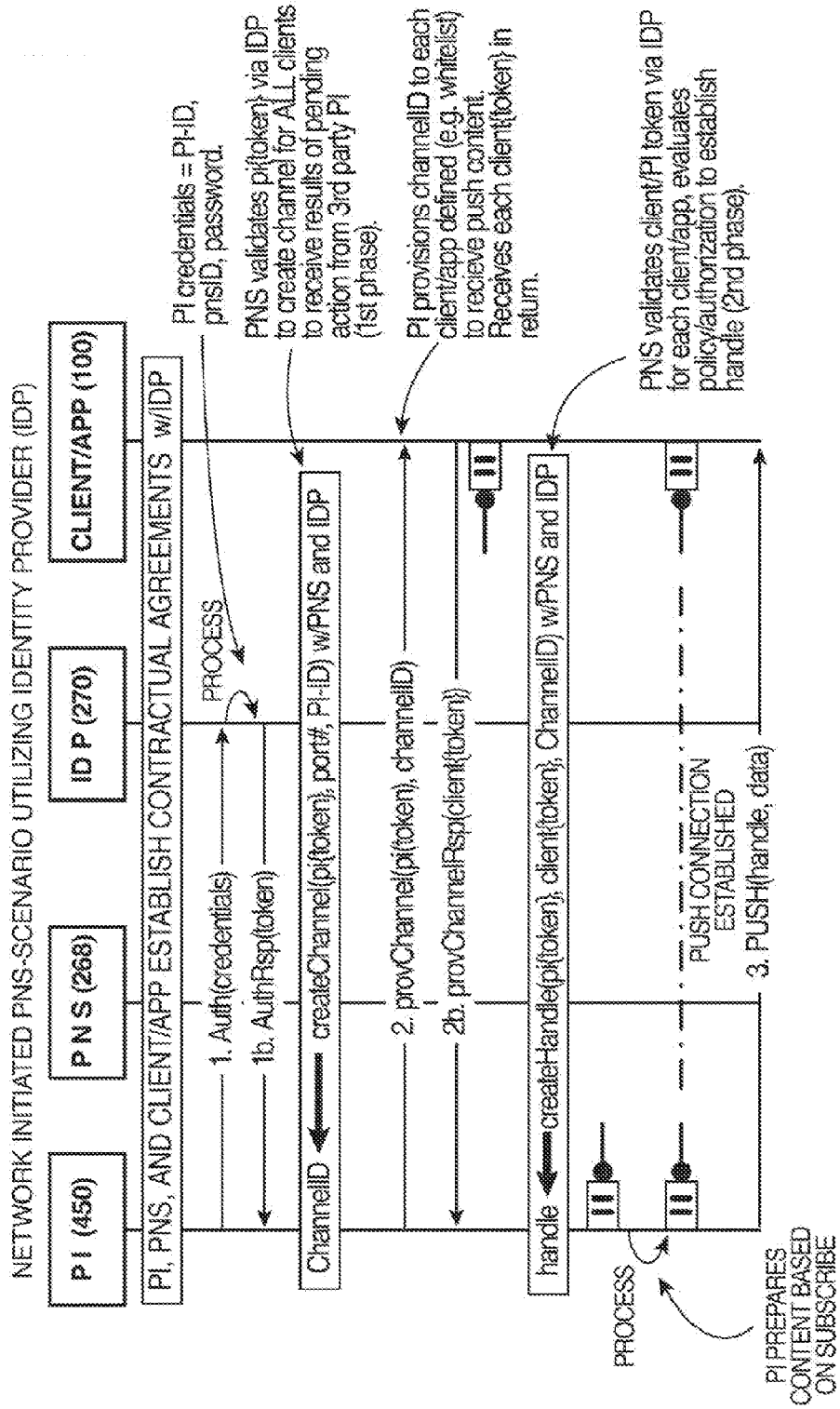
FIG. 4C is a block diagram illustrating interactions between components in the establishment of a push pathway in a network-initiated scenario, in accordance with at least one embodiment.

Referring to FIG. 4C, shown there is a block diagram illustrating interactions between components in the establishment of a push pathway in a network-initiated scenario, in accordance with at least one embodiment. The network-initiated scenario is similar to the client-initiated scenario illustrated in FIG. 4B (and the reader is directed to the earlier parts of the description for additional details), with certain distinguishing features discussed below.

In the network-initiated scenario, the client device 100 has either been pre-provisioned with a well-known port number, and/or the user of client device 100 has explicitly or implicitly agreed (typically in advance) to receive push content on behalf of a service provider. For example, a service provider that is an operating system vendor may issue a software patch to the client device 100 in this way. It is not necessary for the client device 100 to provide the service provider with a separate, explicit subscription request to initiate establishment of the push pathway.

In FIG. 4C, the service provider (PI 450) authenticates with the IDP 270 in steps #1 and #1b. Concurrently with, or prior to steps #1 and #1b, both a client device 100, and possibly other elements, may also authenticate with the IDP 270. Further, each successful authentication with the IDP 270 results in the receipt (by the corresponding authenticated device) of a corresponding authentication token (e.g. a PI authentication token).

While in FIG. 4B, the client device 100 requests establishment of a channel identifier, in FIG. 4C, it is the PI 450 that requests establishment of the channel identifier. In both instances, the request is ultimately provided to the IDP 270 (e.g. as delegated to by PNS 268), which returns the channel identifier to the corresponding requestor. In variant embodiments, however, the IDP 270 may process the request and return the results of the processing to another element, such as PNS 268, which may then allocate a channel identifier (or error indicator as the case may be) in response.

The act of the PI 450 requesting the channel identifier and associated processing is represented by the rectangle underneath step 1*b* of FIG. 4C. The request may incorporate an identifier that indicates that it is a channel creation request originating from a PI 450, as distinguished from a channel creation request originating from a client device 100. Other techniques for differentiating the request in the network-initiated scenario may be employed. In at least one embodiment, the port number used in the channel creation request in the network-initiated scenario is a 'well known' port number—e.g., port numbers analogous to common network ports used with other transport protocols (e.g. HTTP port-80, telnet port-23).

As with the client-initiated scenario, other validation acts may be performed before a channel identifier is allocated by the IDP 270. For example, validation may comprise determining that a specific push directionality is correct. For example, 'directionality' is identified based on the origin of the channel creation request (e.g. verifying that the token in the request corresponds to a PI 450, and the direction of the channel is to be from the PI 450 to client device 100), and the IDP 270 may decline allocating a channel identifier if the directionality is not successfully validated.

In one embodiment, IDP 270 will first attempt to determine whether the token received for a PI 450 matches the token that IDP 270 originally created when the PI 450 device was previously authenticated. If there is a match, then IDP 270 can proceed and check other aspects, such as directionality as noted above; otherwise, error processing may be performed for example. Furthermore, it may be possible that service providers belonging to a specific domain may NOT be permitted to transmit push content to client devices 100. As a result, the IDP 270 may evaluate a policy or authorization data as part of the validation process, and in response, determine that push notifications are not permitted to be sent to the client device, such that a channel identifier is not allocated and returned back to the PNS 268 (and ultimately to PI 450).

Step #2 as shown in FIG. 4C illustrates follow-up acts (performed by the PI 450) as a result of a successful channel creation request. That is, a PI 450 provides a channel identifier to each unique client device or application that the PI 450 is to push content toward. The providing of this channel identifier may be carried out without any overt indication being given (e.g. to the user) on the particular client device or application. Consent may have been provided automatically when the client device or application was first used, or when the device was unpacked and the device received input indicating acceptance of service terms, for example.

Step #2*b* of FIG. 4C demonstrates the client device 100 acknowledging receipt of the channel identifier by responding with its own client authentication token (i.e. previously received from IDP 270). This token is then combined with the PI's own authentication token, to subsequently establish a handle as part of a resulting push pathway to be established for each unique client that is to receive push content. This is illustrated in the rectangle shown below step #2*b*. Some validation acts, which may be analogous to acts performed by the IDP 270 as previously described with respect to the establishment of a handle in the client-initiated scenario, may also be performed prior to establishing the handle. For example, the correct push directionality may be verified (e.g. checking that the authentication token corresponding to a service provider originates from PI 450). Additional validations may also involve policy-based determinations such as whether the user of client device 100 is of a certain age, or whether the PI 450 belongs to a domain that is permitted to transmit content. Some or all of these acts may be delegated to (e.g. by PNS 268) and performed by IDP 270.

A PI 450 is then able to push content to each established push pathway of a corresponding client device 100 or application (e.g. of client device 100), whereby the push pathway logically encapsulates the handle (i.e. from PI 450) and a channel identifier for a well-known port number (from client device 100).

Figure 5:
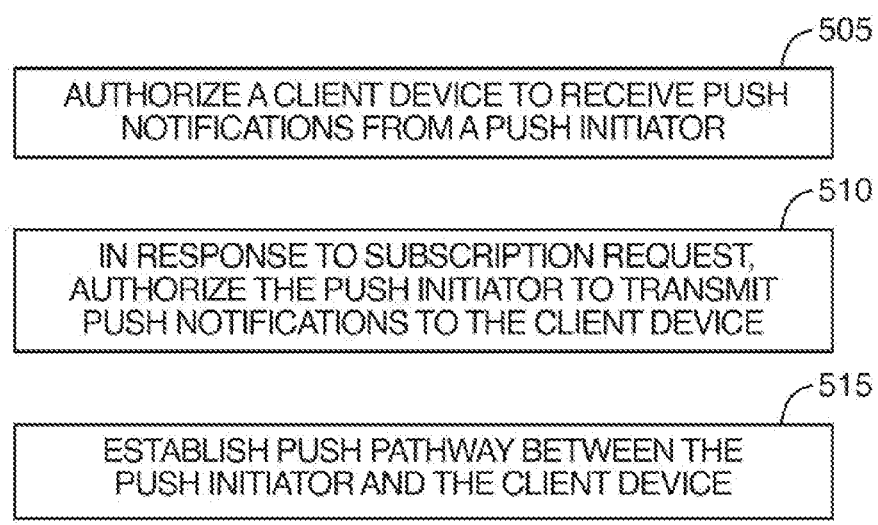
FIG. 5 is a block diagram illustrating acts associated with establishing a push pathway where a client-initiated subscription request is transmitted from a client device to a push initiator element, in accordance with at least one embodiment.
Figure 6B:
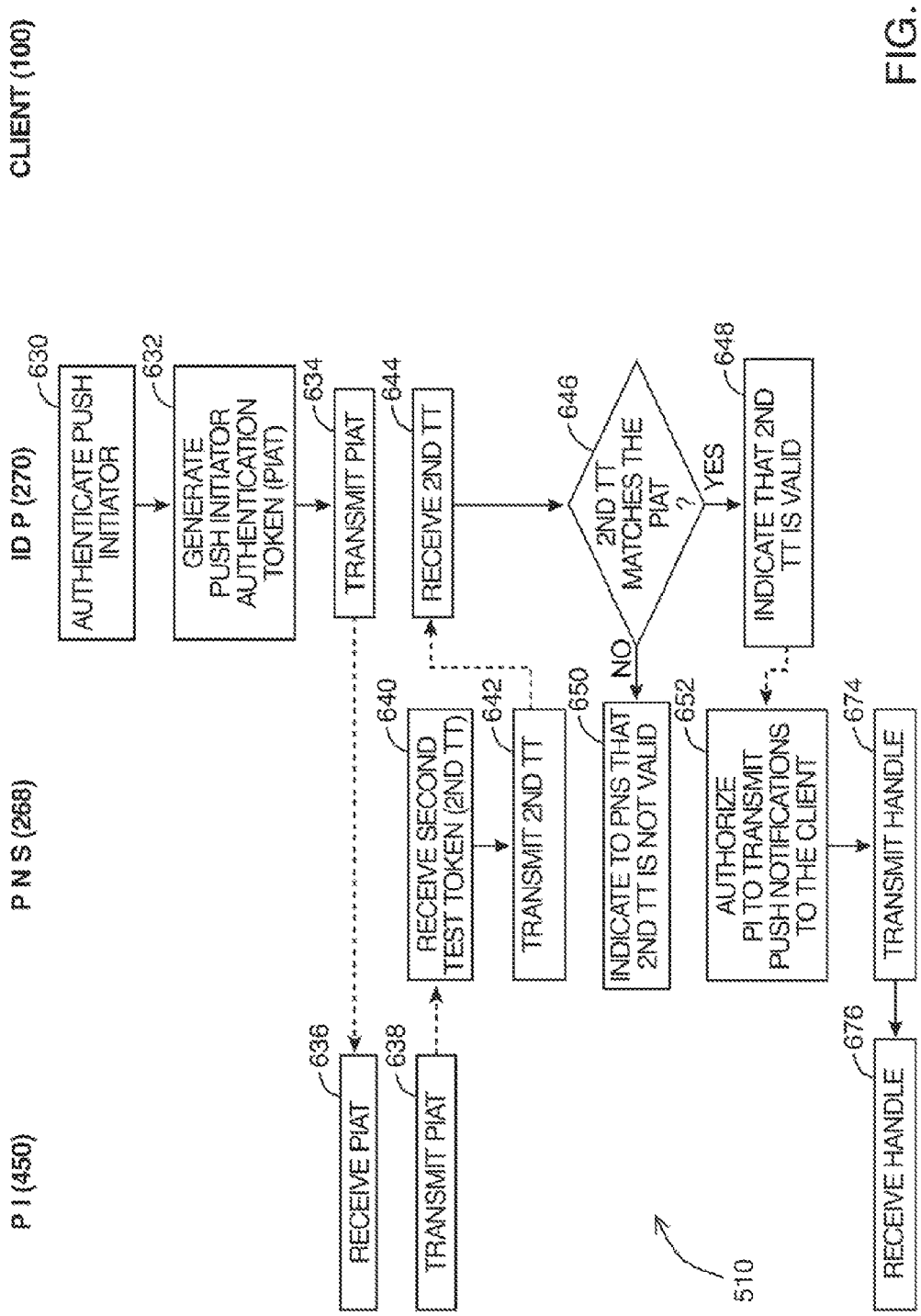
FIG. 6B is a process flow diagram illustrating the interaction and sequence of events amongst a push initiator element, a push notification server, and an identity provider element when authorizing a push initiator element to transmit push notifications in a second phase associated with the client-initiated scenario, in accordance with one embodiment.
Figure 7:
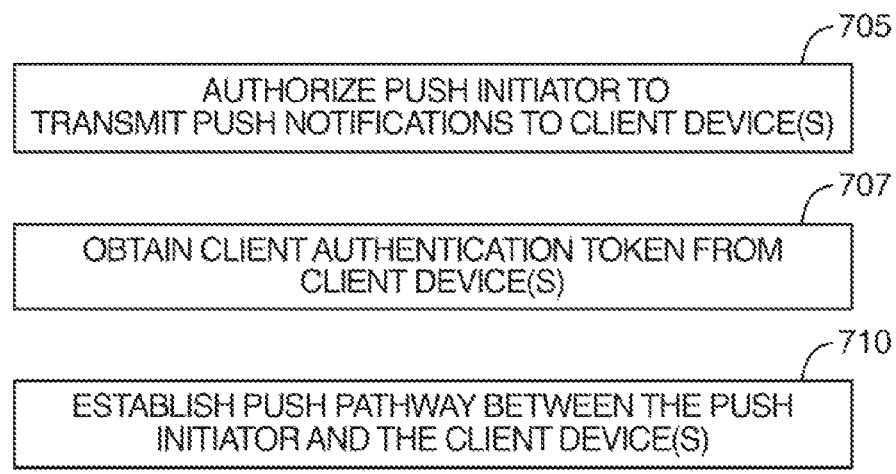
FIG. 7 is a block diagram illustrating acts associated with establishing a push pathway in the network-initiated scenario, in accordance with at least one embodiment.

Reference is now made to FIGS. 5 to 7. FIG. 5 is a block diagram illustrating, in summary form, a number of discreet acts performed in the establishment of a push pathway in a client-initiated scenario, as previously described with reference to FIG. 4B. The reader is directed to the earlier parts of the description with respect to FIG. 4B for further details. FIG. 7 is a block diagram illustrating, in summary form, a number of discreet acts performed in the establishment of a push pathway in a network-initiated scenario, as previously described with reference to FIG. 4C. The reader is directed to the earlier parts of the description with respect to FIG. 4C (and FIG. 4B where applicable) for further details.

The examples associated with the first and second scenarios also illustrate differences that are dependent on whether the push pathway is being established because a client device is explicitly requesting push content from the push initiator element (e.g. via an explicit subscription request), or whether the push pathway is being established because the push initiator element itself is initiating the process (e.g. not explicitly prompted by the client device). In the latter case, the client device may have already implicitly requested push notifications from the particular push initiator element at some earlier stage (e.g. when accepting service terms upon the initial use of the client device).

Referring now to the client-initiated scenario and FIG. 5, at 505, a client device 100 is authorized, by the push notification server, to receive push notifications from a push initiator element 268 in a first phase of establishing a push pathway in the client-initiated scenario. This generally entails requesting that an identity provider element 270 first authenticate the identity of the client device 100, and to verify that the client device 100 is permitted to subscribe for the specific content requested from or to be otherwise provided by the push initiator element 450. If this client device 100 is successfully authorized, a channel will be established, as identified by a channel identifier. FIG. 6A illustrates acts that may be performed at 505, in one example embodiment.

At 510, a push initiator element 450 is authorized, by the push notification server 268, to transmit push notifications to the client device 100 in a second phase of establishing a push pathway in the client-initiated scenario. Act 510 is triggered by the receipt of a subscription request received from the client device by the push initiator element. This generally entails requesting that the identity provider element 270 authorize both the client device 100 and the push initiator element 450. If the identity provider element successfully authorizes this request, a handle associated with the previously determined channel identifier is established. FIG. 6B illustrates acts that may be performed at 510, in one example embodiment.

At 515, given that the push initiator element 450 now has a handle, and the handle has a valid reference through the channel, the push pathway has been established and the push initiator element 450 is able to initiate a push notification to the client device 100. The push initiator element 450 prepares the push content based on the subscription request, and uses the handle to push subscribed-for content to the client device 100.

Referring now to FIG. 6A, shown generally as 505 (see FIG. 5) is a process flow diagram illustrating the interaction and sequence of events amongst a push notification server 268, an identity provider element 270 and a client device 100 in a first phase of establishing a push pathway in the client-initiated scenario, in accordance with one example embodiment. Other additional elements may be authorized in variant embodiments, but are not shown in this example for ease of exposition.

At 602, the identity provider element 270 authenticates the client device 100. To authenticate the client device 100, the identity provider element 270 may receive and verify one or more security credentials associated with the client device 100. These security credentials may include, for example, a user identifier and/or a password associated with the client device 100. In other embodiments, credentials may include an instance or lifetime identifier, a personal identification number, and/or a push notification server identifier. As noted above, the communication of these security credentials may be encrypted to ensure they are securely communicated.

If the client device 100 is successfully authenticated 602, the identity provider element 270 may generate a client authentication token (abbreviated as CAT) in response at 604. At 606, the identity provider element 270 may transmit the client authentication token to the client device 100. In certain embodiments, the token may be further encrypted (e.g. by a one-time session key generated by the identity provider element 270 and used to encrypt the token).

The client device 100 proceeds to request the creation of a channel identifier from the push notification server 268. This request is made when the client device 100 is to be configured to receive content from push initiator element 450, and possibly other push initiator elements (not shown). The request may be part of an initialization or device/application bootstrap step wherein the client device 100 indicates to the PNS which push initiator elements the client device 100 intends to utilize at some point time after the initialization, or it can be part of an initial stage of a subscription phase before the client device 100 subscribes to any specific content provider or push initiator element.

The client device 100 transmits the client authentication token to the push notification server 268 (at 610), typically along with other data such as a logical port number and a service provider or content identifier, which is received at the push notification server 268 (at 612). The client authentication token indicates to the push notification server 268 that the client device 100 was previously authenticated by the identity provider element 270. The client authentication token itself is subject to validation by the push notification server 268 before a channel identifier is returned to the client device 100.

The client authentication token received at 612 is validated by the push notification server 268 with help from the identity provider element 270. In one embodiment, this may entail confirming that the copy of the client authentication token received by the push notification server 268 is the same token that was originally issued to the client device (at 606) by the identity provider element 260. For example, at 612, the push notification server 268 receives what is presumed to be an authentic copy of the client authentication token, referred to in FIG. 6A as a first test token (abbreviated as 1$^{st}$ TT). The push notification server 268 may transmit the first test token to the identity provider element 270 (at 614), which is received at the identity provider element 270 at 616. At 618, the identity provider element 270 may then verify the first test token by determining if the first test token matches the client authentication token previously generated (at 604) at the identity provider element 270. If there is a match, at 620, the identity provider element 270 may indicate that the client authentication token as received by the push notification server 268 (i.e. the first test token) is valid. If the first test token does not match the client authentication token, then at 622, the identity provider element 270 indicates to the push notification server 268 that the first test token was not successfully validated. Additional error processing may be performed in certain embodiments.

In other embodiments, the token could include other data (e.g. the PIN of the client device, chapter lifetime, etc.), which may be encrypted. The identity provider element 270 could decrypt these, and subsequently verify that the client device is associated with the proper user credentials (i.e. is this the right user for the given device, etc.).

To facilitate the validations, the identity provider element 270 may have stored a copy of the client authentication token after it was generated at 604 and/or user profile information pertaining to the user of client device 100 (storing act not explicitly shown in FIG. 6A). For example, a table (accessible to or stored on the identity provider element 270) keyed by the token may be utilized. The table may map the token to other data received by client device 100 as well, for use in validating the authentication token.

Other techniques for validating a client authentication token may be employed in variant embodiments.

In other embodiments, further validation or verification steps may be made at the identity provider element 270 and/or the push notification server 268, before authorizing the client device 100 for push notifications. For example, a verification that is based on user profile information pertaining to the user of client device 100 (e.g. verified age of the user) may be made before the push notification server 268 will issue a channel identifier. This is where, for example, the push notification server 268 (or identity provider element 270) can block a user of a client device 100 who would not be permitted to receive certain age-restricted content. As further examples, rather than delegating certain verification tasks to IDP 270 the push notification server 268 may perform the tasks, including for instance, verifying the service provider identifier, the port number, and aspects pertaining to the client device 100 (e.g. verifying that the device has capabilities to receive particular content to be delivered by the push initiator element 450).

In other embodiments, the identity provider element 270 may be configured to determine that the client authentication token has not expired, if for example the authentication token included a timeout or time-to-live period. If the identity provider element 270 determines that the client device 100 has an expired client authentication token, it may independently re-challenge the client device to undergo a re-authentication. The client authentication token will not be successfully validated if the re-authentication fails, and the push notification server 268 may be informed accordingly, causing the push notification server 268 to withhold the issuance of the channel identifier (and therefore, preventing the push pathway from being established). The push notification server 268 may issue an error response to the client device 100. In these situations where the expiry of the authentication token causes periodic re-authentication of the client device, processing associated with the re-authentication can be offloaded to the identity provider element 270, thereby further reducing the processing burden on the push notifications server 268.

If the client authentication token was successfully validated, and all other verification checks that may have been performed are successful, then at 624, the push notification server 268 authorizes the client device to receive push notifications from the push initiator element, and transmits a channel identifier to the client device (at 626), which is received at the client device (at 628).

The identity provider element assists the push notification server 268 in performing certain authentication, authorization, and/or verification functions (including assisting in the validation of a client authentication token), so that the push notification server 268 can establish the client device 100 as an endpoint of a push pathway for push notifications from a push initiator element. Accordingly, with one endpoint of the push pathway being established, the channel identifier issued to the client device (100) maybe subsequently used to establish other endpoints of the push pathway.

Referring to FIG. 6B, shown generally as 510 is a process flow diagram illustrating the interaction and sequence of events amongst a push initiator element 450, a push notification server 268, and an identity provider element 270 in a second phase of establishing a push pathway, in accordance with one example embodiment. At least some of the acts of FIG. 6B are performed in response to a client device 100 subscribing for content from the push initiator element 450, using a client authentication token previously received from the identity provider element 270 and a channel identifier previously received from the push notification server 268.

At 630, the identity provider element 270 authenticates the push initiator element 450. Similar to the authentication of the client device, authentication may be performed, for example, by receiving and verifying one or more security credentials associated with the push initiator element endpoint at the identity provider element 270. The security credentials may include, for example, an identifier such as a content provider identifier and/or a password associated with an organization associated with the push initiator element. In other embodiments, push initiator element 450 may also include a specific identifier corresponding to a particular push notification service (e.g. provided by push notification server 268). If the push initiator element successfully authenticates, at 632, a push initiator element authentication token (abbreviated as PIAT) may be generated in response. At 634, this push initiator element authentication token may then be transmitted to the push initiator element 450. The push initiator element authentication token may be received at the push initiator element 450 (act 636). Although acts 630 to 636 are shown in the example of FIG. 6B, these acts may be performed in advance in certain implementations, and need not be in response to the subscription request received.

The push initiator element authentication token may be subsequently transmittable by the push initiator element 450 to the push notification server 268 (act 638). The push initiator element 450 may transmit, amongst other aspects, the push initiator element authentication token to the push notification server 268 in response to a subscription request seeking to authorize the push initiator element 450 to transmit push notifications to the client device 100, in a "handle request". Typically, a client authentication token, as received with the subscription request from the client device 100, is also transmitted with the push initiator element authentication token to the push notification server 268 in the handle request. In variant implementations, the push initiator element authentication token may be sent to the push notification server 268 (e.g. when it is first provided to the push initiator element 450 or when it is updated) in advance of receiving the subscription request. In a variant embodiment, the handle request may include the client authentication token, but not the push initiator element authentication token.

The push initiator element authentication token received at 640 is validated by the push notification server 268 with help from the identity provider element 270. In one embodiment, this may entail confirming that the copy of the push initiator element authentication token received by the push notification server 268 is the same token that was originally issued to the push initiator element. In one example validation process, at 640, the push notification server 268 receives what is presumed to be an authentic copy of the push initiator element authentication token, referred to in FIG. 6B as a second test token (abbreviated as $2^{nd}$ TT). In order to validate the push initiator element authentication token, the push notification server 268 may then transmit the second test token to the identity provider element 270 at 642. The second test token is received at the identity provider element 270 (act 644). At 646, the identity provider element 270 determines if the second test token matches the push initiator element authentication token previously generated (at 632) at the identity provider element 270. Matching may include the identity provider element 270 decrypting the push initiator element authentication token and/or may involve some other process (e.g. based on hashing including a hashed message authentication code, or sums). If so, at 648, the identity provider element 270 may indicate to the push notification server 268 that the push initiator element authentication token was successfully validated. However, if the second test token does not match the push initiator element authentication token as previously generated, then at 650, the identity provider element 270 indicates that second test token did not successfully validate, and the push initiator element 450 may be requested to re-authenticate with the identity provider element 270, or alternatively, the identity provider element 270 may 'challenge' the push initiator element 450 to re-authenticate and capture the correct 'generated' authentication token for the push initiator element 450.

To facilitate validations, the identity provider element 270 may have stored a copy of the push initiator element authentication token after it was generated at 632 by the identity provider element 270 (storing act not explicitly shown in FIG. 6B). Other techniques of validating the push initiator element authentication token may be employed in variant embodiments.

In a variant embodiment, the identity provider element 270 may map or correlate the channel identifier of push initiator element 450 with the port of client device 100 based on decrypting and unpacking/decoding the push initiator and client device authentication tokens. As a result, the identity provider element 270 is able to verify (at some point later on) that a handle request (sent by push initiator element 450) to the push notification server 268 has both valid tokens (i.e. the correct push initiator element authentication token and the correct client authentication token). Data forwarded to the identity provider element 270 may be decrypted and re-mapped as part of the validation process.

Although not explicitly shown in FIG. 6B, the client authentication token, originally provided to the push notification server 268 with the subscription request from the client device 100 but now transmitted to the push notification server 268 by the push initiator element 450 with the push initiator element authentication token, may be re-validated with the assistance of the identity provider element 270, to ensure that the client device 100 is still authorized to receive content from the push initiator element 450. Any other tokens provided to the identity to the push notification server 268 by the push initiator element 450 may also be validated with the assistance of the identity provider element 270 before the push initiator element 450 may be successfully established as an endpoint of the push pathway.

In other embodiments, further verification steps may be performed at the identity provider element 270 and/or the push notification server 268, before authorizing the push initiator element 450. Additional checks may be performed to evaluate whether the client device 100 and/or the push initiator element 450 is authorized to make use of the handle for the push pathway that is to be established.

If the push initiator element authentication token was successfully validated, and all other verification checks that may have been performed are successful, then at 652, the push notification server 268 authorizes the push initiator element 450 to transmit push notifications to the client device 100, by associating the channel identifier with the generated handle and transmits this to the push initiator element (at 674). The handle is received at the push initiator element (at 676). Accordingly, a second endpoint of the push pathway has now been established.

Given that the push initiator element 450 now has a handle, the push pathway has been established and the push initiator element 450 is able to initiate a push notification to the client device 100. The push initiator element 450 prepares content based on the subscription request, and uses the handle to push subscribed-for content to the client device 100 (see e.g. 515 of FIG. 5).

As with client authentication tokens, a push initiator element authentication token may similarly be configured to expire. As such, the discussion above with regards to the expiry of client authentication tokens may similarly apply to push initiator element authentication tokens and associated push initiator elements.

Referring now to the network-initiated scenario and FIG. 7, at 705, a push initiator element 450 is authorized, by the push notification server, to transmit push notifications to one or more client devices or applications, which may include client device 100. In contrast to the examples described with reference to FIGS. 5, 6A, and 6B, in the network-initiated scenario, it is the push initiator element that requests the establishment of a channel identifier, and not the potential recipient client device(s).

In one embodiment, authorization of the push initiator element 450 by the push notification server at 705 entails authentication of the push initiator element 450, and possible additional verifications, similar to the authentication and checks performed in the initial acts of the method described with reference to FIG. 6B, and the reader is directed to the earlier parts of the description for further details. A successful authentication of the push initiator element results in the generation, by the identity provider element, of a corresponding push initiator element authentication token that is returned to the push initiator element. The push notification server then creates a channel identifier to be associated with all client devices that are to receive notifications from the push initiator element over the push pathway to be established. In at least one embodiment, a well-known port number is used in the creation of the channel identifier (e.g. as no port number may have been received from the client devices), such that the push initiator element, once authorized to do so, can push content to various client devices via the port (at 710).

The term port "number" is used generally herein, but it will be understood by persons skilled in the art that any port identifier generally may be employed. A port may be defined generally as the logical entity in which a client device (e.g. a push agent running on the client device) receives a push notification via a push notification server. A port may also be identified by, for example, a canonical identifier or a uniform resource identifier (URI).

Further, all other endpoints of the push pathway, including the client device 100, are also authenticated either at 705, or in advance of 705. Authentication and checks performed with respect to the client device may be similar to the authentication and checks performed in the initial acts of the method as described with reference to FIG. 6A, and the reader is directed to the earlier parts of the description for further details. A successful authentication of a given device (or other endpoint element) results in the generation, by the identity provider element, of a corresponding authentication token that is returned to the respective authenticated device.

In addition, since the acts of FIG. 7, in contrast to FIG. 5, were not initiated by a subscription request received from the client device 100, the push notification server may not yet be in possession of the client authentication token of the client device 100, which might normally have otherwise accompanied the subscription request. In one embodiment, at 707, the channel identifier created by the push notification server at 705 is transmitted to the client device 100 by the push initiator element (which may be performed without explicitly notifying a user of the client device if consent was previously provided); in return, client device 100 transmits its client authentication token back to the push initiator element.

If the push initiator element 450 was successfully authorized at 705, a handle associated with the channel identifier for each client device to which content is to be pushed is subsequently established, using the respective client authentication token for each client device. The creation of the handle may first require successful validation of the client authentication tokens and the push initiator element authentication token(s), and potentially the performance of additional verifications, in a manner similar to the analogous acts as previously described with respect to the client-initiated scenario.

At 710, given that the push initiator element 450 now has a handle, the push pathway has been established and the push initiator element 450 is able to initiate a notification to the client device 100 for content. The push initiator element 450 prepares content based on the subscription request, and uses the handle to push subscribed-for content to the client device 100.

In network-initiated scenarios, the push initiator element 450 is configured to push data to the client device 100, which may be done without explicitly notifying the user at the client device 100. For example, if a client device 100 had already recorded consent to receive push notifications when initially installing the application, this scenario may be applicable. As a further example, if a push initiator element 450 is a software update server, the server may be configured to push a critical software patch or emergency message to a subset of client devices without necessarily requiring further consent of the client device user.

It will be understood by persons skilled in the art, that various acts of the methods depicted in the Figures (e.g. FIGS. 5, 6A, 6B, and 7) may be performed in an alternate order or concurrently, in variant implementations.

In variant implementations, some of the acts of one or more methods described herein may be provided as software instructions, stored on computer-readable storage media and executable by a processor. Examples of computer-readable storage media may include a hard disk, a floppy disk, an optical disk (e.g. a compact disk, a digital video disk), a flash drive or flash memory, magnetic tape, and memory. Other configurations are possible as well.

In variant implementations, some of the acts of one or more methods described herein may be provided as executable software instructions stored in transmission media.

It should also be noted that at least some of the elements used to perform at least one of the methods of authorizing endpoints of a push pathway described that are implemented via software may be written in a high-level procedural language such as object oriented programming. Accordingly, the program code may be written in C, C++, Java or any other suitable programming language and may comprise modules or classes, as is known to those skilled in object oriented programming. Alternatively, in addition thereto, at least some of these elements implemented via software may be written in assembly language, machine language or firmware as needed. In either case, the program code can be stored on a storage media or on a computer readable medium that is readable by a general or special purpose programmable computing device having a processor, an operating system and the associated hardware and software that is necessary to implement the functionality of at least one of the methods of selecting a communication mode described herein. The program code, when read by a processor, configures the processor to operate in a new, specific and predefined manner in order to perform at least one of the methods of resetting an inactivity timer of each of a first and second computing device described herein.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The present disclosure makes reference to a number of embodiments. However, it will be understood by persons skilled in the art that other variants and modifications may be made without departing from the scope of the embodiments defined in the claims appended hereto.

The invention claimed is:

1. A method of authorizing endpoints of a push pathway for push notifications, the endpoints comprising a push initiator element and a client device, the method to be performed by an identity provider element that operates independently of a push notification server configured to control transmission of push notifications from the push initiator element to the client device over the push pathway, the push pathway comprising a logical network connection amongst the push notification server, the push initiator element and the client device, the method comprising:
the identity provider element authenticating the client device based on one or more security credentials associated with the client device;
in response to a successful authentication of the client device, the identity provider element generating and transmitting to the client device a client authentication token associated with the client device;
the identity provider element determining validity of a test client authentication token purporting to be the client authentication token and providing to the push notification server a first indication of the validity of the test client authentication token;
the identity provider element authenticating the push initiator element based on one or more security credentials associated with the push initiator element; and
in response to a successful authentication of the push initiator element, the identity provider element generating and transmitting to the push initiator element a push initiator element authentication token associated with the push initiator element;
the identity provider element determining validity of a test push initiator element authentication token purporting to be the push initiator element authentication token and providing to the push notification server a second indication of the validity of the test push initiator element authentication token,
wherein, in the event that the identity provider element successfully validates the test client authentication token, the first indication permits the push notification server to determine a channel identifier, and
wherein, in the event that the identity provider element successfully validates the test client authentication token and the test push initiator element authentication token, the first indication and the second indication permit the push notification server to determine a handle for the push pathway, wherein the handle is associated with the channel identifier and is used to establish the push pathway for transmission of push notifications from the push initiator element to the client device.

2. The method of claim 1, wherein the validating of the test push initiator element authentication token is responsive to a client-initiated subscription request.

3. The method of claim 1, wherein at least one additional endpoint for the push pathway is to be successfully authenticated before the push pathway is established.

4. The method of claim 1, wherein at least one of the client authentication token or the push initiator element authentication token is configured to expire.

5. A system for authorizing endpoints of a push pathway for push notifications, the system comprising:
endpoints comprising a push initiator element and a client device;
an identity provider element that establishes endpoints of the push pathway, wherein the identity provider element is configured to:
authenticate the client device based on one or more security credentials associated with the client device;
in response to a successful authentication of the client device, generate and transmit to the client device a client authentication token associated with the client device;
determine validity of a test client authentication token purporting to be the client authentication token;
authenticate the push initiator element based on one or more security credentials associated with the push initiator element; and
in response to a successful authentication of the push initiator element, generate and transmit to the push initiator element a push initiator element authentication token associated with the push initiator element;
determine validity of a test push initiator element authentication token purporting to be the push initiator element authentication token; and
a push notification server that controls push notifications to be transmitted from the push initiator element to the client device over the push pathway, wherein the push notification server operates independently of the identity provider element, and wherein the push pathway comprises a logical network connection amongst the push notification server, the push initiator element and the client device, the push notification server configured to:
determine a channel identifier in response to a successful validation of the test client authentication token; and
determine a handle for the push pathway, wherein the handle is associated with the channel identifier and established in response to a successful validation of both the test client authentication token and the test push initiator element authentication token;

wherein the push pathway is established for transmission of push notifications from the push initiator element to the client device upon establishing the handle for the push pathway.

6. The system of claim 5, wherein validating the test push initiator element authentication token and establishing the handle is responsive to a client-initiated subscription request.

7. The system of claim 6, wherein the channel identifier is transmitted to the client device in response to the successful validation of the test client authentication token for a given port, and wherein the client device transmits, to the push initiator element, the client authentication token, and the channel identifier to the push initiator element in the client-initiated subscription request.

8. The system of claim 5, wherein the channel identifier is established in response to a channel creation request by the client device transmitted to the push notification server, and wherein the channel creation request comprises at least one of the client authentication token, a port identifier, or an identifier for the push initiator element.

9. The system of claim 5, wherein establishing the handle is not responsive to a client-initiated subscription request for push notifications transmitted from the client device to the push initiator element, and wherein the push initiator element transmits the channel identifier to the client device, and receives, from the client device, the client authentication token.

10. The system of claim 5, wherein the channel identifier is established in response to a channel creation request by the push initiator element transmitted to the push notification server, and wherein the channel creation request comprises at least one of: the push initiator element authentication token, a port identifier, or an identifier of the push initiator element.

11. The system of claim 10, wherein the port identifier comprises a known port number associated with the client device.

12. The system of claim 5, wherein at least one additional endpoint for the push pathway is to be successfully authenticated before the push pathway is established.

13. The system of claim 5, wherein the push initiator element transmits data over the push pathway after establishing the push pathway.

14. The system of claim 5, wherein at least one of the client authentication token or the push initiator element authentication token is configured to expire.

15. Non-transitory computer-readable media comprising instructions for execution by a processor, wherein the instructions when executed, cause an identity provider element to authorize endpoints of a push pathway for push notifications, the endpoints comprising a push initiator element and a client device, the identity provider element operating independently of a push notification server configured to control transmission of push notifications from the push initiator element to the client device over the push pathway, the push pathway comprising a logical network connection amongst the push notification server, the push initiator element and the client device, the instructions comprising:

instructions for the identity provider element authenticating the client device based on one or more security credentials associated with the client device;

instructions for the identity provider element, in response to a successful authentication of the client device, generating and transmitting to the client device a client authentication token associated with the client device;

instructions for the identify provider element determining validity of a test client authentication token purporting to be the client authentication token and providing to the push notification server a first indication of the validity of the test client authentication token;

instructions for the identity provider element authenticating the push initiator element based on one or more security credentials associated with the push initiator element; and instructions for the identity provider element, in response to a successful authentication of the push initiator element, generating and transmitting to the push initiator element a push initiator element authentication token associated with the push initiator element;

instructions for the identity provider element determining validity of a test push initiator element authentication token purporting to be the push initiator element authentication token and providing to the push notification server a second indication of the validity of the test push initiator element authentication token, wherein, in the event that the identity provider element successfully validates the test client authentication token, the first indication permits the push notification server to determine a channel identifier, and wherein, in the event that the identity provider element successfully validates the test client authentication token and the test push initiator element authentication token, the first indication and the second indication permit the push notification server to determine a handle for the push pathway, wherein the handle is associated with the channel identifier and is used to establish the push pathway for transmission of push notifications from the push initiator element to the client device.

16. The computer-readable media of claim 15, wherein the validating of the test push initiator element authentication token is responsive to a client-initiated subscription request.

17. An identity provider apparatus for authorizing endpoints of a push pathway for push notifications, the endpoints comprising a push initiator element and a client device, the identity provider apparatus operating independently of a push notification server configured to control transmission of push notifications from the push initiator element to the client device over the push pathway, the push pathway comprising a logical network connection amongst the push notification server, the push initiator element and the client device, the identity provider apparatus comprising:

a processor; and a memory comprising instructions which, when executed by the processor, cause the identity provider apparatus:

to authenticate the client device based on one or more security credentials associated with the client device;

in response to a successful authentication of the client device, to generate and transmit to the client device a client authentication token associated with the client device;

to determine validity of a test client authentication token purporting to be the client authentication token and to provide to the push notification server a first indication of the validity of the test client authentication token associated;

to authenticate the push initiator element based on one or more security credentials associated with the push initiator element; and in response to a successful authentication of the push initiator element, to generate and transmit to the push initiator element a push initiator element authentication token associated with the push initiator element;

to determine validity of a test push initiator element authentication token purporting to be the push initiator element authentication token and to provide to the push notification server a second indication of the validity of the test push initiator element authentication token, wherein, in the event that the identity provider apparatus successfully validates the test client authentication token, the first indication permits the push notification server to determine a channel identifier, and wherein, in the event that the identity provider apparatus successfully validates the test push initiator element authentication token, the second indication permits the push notification server to determine a handle, wherein the handle is associated with the channel identifier and is used to establish the push pathway for transmission of push notifications from the push initiator element to the client device.

18. The apparatus of claim 17, wherein the validating of the test push initiator element authentication token associated with the second endpoint is responsive to a client-initiated subscription request.

19. The apparatus of claim 18, wherein at least one additional endpoint for the push pathway is to be successfully authenticated before the push pathway is established.

20. The apparatus of claim 19, wherein at least one of the client authentication token or the push initiator element authentication token is configured to expire.

* * * * *

UNITED STATES PATENT AND TRADEMARK OFFICE
CERTIFICATE OF CORRECTION

| | |
|---|---|
| PATENT NO. | : 9,276,917 B2 |
| APPLICATION NO. | : 13/609404 |
| DATED | : March 1, 2016 |
| INVENTOR(S) | : Brian Edward McColgan |

It is certified that error appears in the above-identified patent and that said Letters Patent is hereby corrected as shown below:

Claims

Column 33, Claim 18, lines 2-3 should recite "test push initiator element authentication token is responsive to a client-initiated"

Signed and Sealed this
Third Day of May, 2016

Michelle K. Lee
*Director of the United States Patent and Trademark Office*